US012703138B2

(12) United States Patent
Scharl et al.

(10) Patent No.: US 12,703,138 B2
(45) Date of Patent: Aug. 11, 2026

(54) SYSTEM FOR PRODUCING PLASTIC CONTAINERS WITH UNIVERSALLY USABLE CHANGING ROBOT AND METHOD THEREFORE

(71) Applicant: KRONES AG, Neutraubling (DE)

(72) Inventors: Thomas Scharl, Hirschau (DE); Andreas Hack, Osterhofen (DE); Martin Wagner, Regensburg (DE); Gerhard Schwoed, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 158 days.

(21) Appl. No.: 18/375,803

(22) Filed: Oct. 2, 2023

(65) Prior Publication Data

US 2024/0109239 A1 Apr. 4, 2024

(30) Foreign Application Priority Data

Sep. 30, 2022 (DE) .................... 10 2022 125 324.4

(51) Int. Cl.
*B29C 49/64* (2006.01)
*B29C 49/28* (2006.01)
(Continued)

(52) U.S. Cl.
CPC .......... *B29C 49/6418* (2013.01); *B29C 49/28* (2013.01); *B29C 49/42065* (2022.05); *B29C 49/42073* (2022.05); *B29L 2031/712* (2013.01)

(58) Field of Classification Search
CPC . B29C 49/28; B29C 49/6418; B29C 49/6825; B29C 49/42065;
(Continued)

(56) References Cited

U.S. PATENT DOCUMENTS

2010/0310705 A1 12/2010 Schoenberger et al. .................... B29C 49/64
2012/0100238 A1 4/2012 Humble et al. ................ 425/90
(Continued)

FOREIGN PATENT DOCUMENTS

DE 102009023726 12/2010 ............ B29C 49/64
DE 102011054890 5/2013 .............. B67C 7/00

OTHER PUBLICATIONS

German Search Report issued in German Patent Appln. No. 10 2022 125 324.4, dated May 22, 2023, with machine English translation, 7 pages.

(Continued)

*Primary Examiner* — Monica A Huson
(74) *Attorney, Agent, or Firm* — HAYES SOLOWAY P.C.

(57) ABSTRACT

A system for producing plastic containers with a heating device for heating plastic preforms, wherein the heating device has a transport device for transporting plastic preforms along a predetermined first transport path, and a plurality of holding devices for holding the plastic preforms and at least one heating device which heats the plastic preforms during the transport thereof and comprising a forming device for forming the plastic preforms to form plastic containers. The forming device is configured for expanding the plastic preforms heated by the heating device by applying a flowable medium, and includes a plurality of forming stations which form the plastic preforms to form the plastic containers. Both the heating device and the forming device have changeable elements, wherein the system has a changing device configured for changing both changeable elements of the heating device and changeable elements of the forming device.

18 Claims, 13 Drawing Sheets

(51) Int. Cl.
*B29C 49/42* (2006.01)
*B29L 31/00* (2006.01)

(58) Field of Classification Search
CPC .............. B29C 49/42073; B29C 49/48; B29C 49/42085; B29C 49/36; B29C 2049/4858; B29C 2049/4863; B29C 49/06; B29C 2949/0715; B29L 2031/7158; B29L 2031/712
See application file for complete search history.

(56) References Cited

U.S. PATENT DOCUMENTS

| | | | | |
|---|---|---|---|---|
| 2014/0305076 | A1 | 10/2014 | Winzinger | B65B 59/04 |
| 2015/0145179 | A1 | 5/2015 | Finger et al. | B29C 49/36 |
| 2015/0251366 | A1 | 9/2015 | Voth et al. | B29D 22/003 |
| 2020/0189896 | A1 | 6/2020 | Raith et al. | B67C 3/22 |
| 2021/0163167 | A1 | 6/2021 | Hahn et al. | B65B 43/54 |

OTHER PUBLICATIONS

Extended Search Report issued in EPO Patent Appln. Serial No. 23195387.8-1014, dated Feb. 9, 2024, with machine English translation, 9 pages.

43
40
1
B

6
A
2
22
4
25
8

10
28
23
24

50
58

57
52
56
P
54
59

50

55

77
73
75

75
70
74a
74
72

12
122

64
124

138
136

134
132
128
126
127
125

90
91

64

110
106

112
102
104
100
114
108

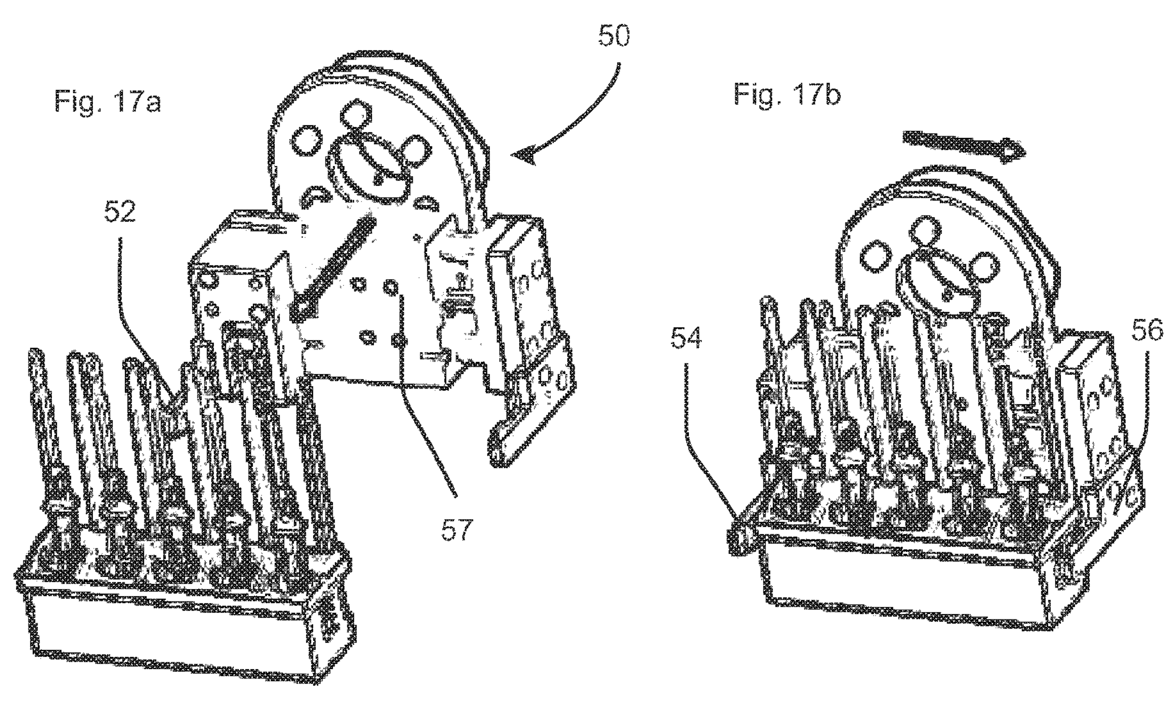
Fig. 17a
50
52
57
Fig. 17b
54
56
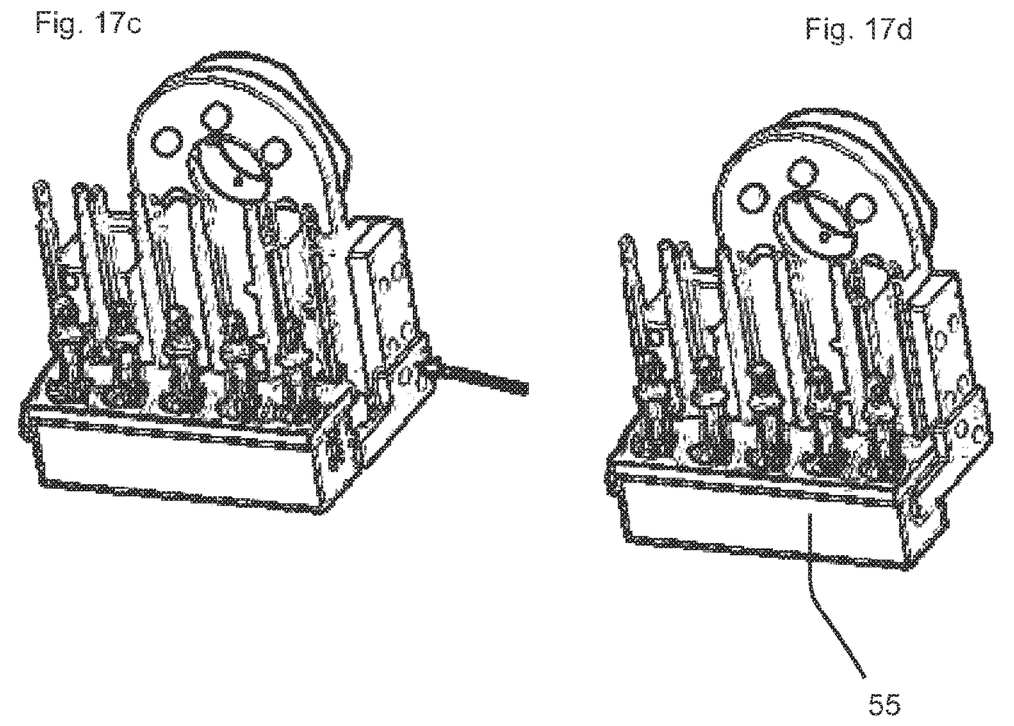
Fig. 17c
Fig. 17d
55

B
A
B
A 70
17
A - A
174
74
172

Detail C
B - B

Detail D

W(4)
32
34
D0
D1
D2
D3
D4
D5
E11
12
D6
E10
D7
E9
D8
E8
D9
F4
E7
D10
F5
E6
D11
E5
D12
E4

D13
E3
D14
E2
E1
D15
12

SYSTEM FOR PRODUCING PLASTIC CONTAINERS WITH UNIVERSALLY USABLE CHANGING ROBOT AND METHOD THEREFORE

BACKGROUND OF THE INVENTION

The present invention relates to a system for producing plastic containers and to a method for producing plastic containers. Such systems and methods have long been known from the prior art. In a known procedure, plastic preforms are first heated in an oven and then these heated plastic preforms are shaped to form the plastic containers, which can take place, for example, by means of stretch blow-molding machines. In this case, the plastic preforms are usually guided individually through an oven and subsequently expanded by a forming device, for example in blowing stations to form the plastic containers.

In the prior art it is occasionally desired to change the containers and, for example, to make a changeover to other containers. Different containers can differ in various characteristics, such as their filling capacity, their mouth diameters and the like. Therefore, it is usually necessary in the prior art to replace a plurality of elements both of the heating device and of the forming device. This is associated with considerable effort in the prior art.

Therefore, partially automated changeover processes are known from the prior art. For example, it is known from the applicant's internal prior art that a manual change of heating mandrels and shielding plates takes place when a mouth diameter is changed. In addition, a semi-automatic changeover machine for heating mandrels and shielding plates is also in development. DE102009023726A1 discloses an automatic changeover machine with a magazine buffer system for the heating mandrel groups that are removed and to be used.

In addition, an automatic change of blow molds by a stationary robot system is also known in the prior art.

Thus, in the prior art, there is still the disadvantage that a change of elements such as shielding plates or heating mandrels is very time-consuming, wherein at the same time the system cannot be operated. With regard to other equipment, such as blow molds, changing them is also complicated and ergonomically disadvantageous, since they are very heavy.

Furthermore, in the prior art, the mounting of incorrect blow molds, heating mandrels or shielding plates or even incorrect mounting of the parts during a manual change occurs often. A further disadvantage in the prior art is that such robot systems often restrict the accessibility of the system.

The object of the present invention is therefore to increase the efficiency of such changeover processes, in particular also by the use of changing robots.

SUMMARY OF THE INVENTION

A system according to the invention for producing plastic containers has a heating device for heating plastic preforms, wherein this heating device has a transport device for transporting plastic preforms along a predetermined first transport path, and a plurality of holding devices for holding the plastic preforms. Furthermore, the heating device has at least one heating unit which heats the plastic preforms during their transport.

Furthermore, the system has a forming device for shaping the plastic preforms into plastic containers, which is suitable for expanding the plastic preforms heated by the heating device by being acted upon with a flowable (and in particular gaseous) medium (in particular compressed air), wherein the forming device having a plurality of forming stations which shape the plastic preforms to form the plastic containers, and wherein both the heating device and the forming device having elements or format parts which can be changed and in particular are changeable elements which can be changed for the purpose of a format change.

In particular, the changeable elements are so-called format parts which are changed when a container type is changed, for example.

According to the invention, the system has a changing device which is suitable for changing both changeable elements of the heating device and changeable elements of the forming device, wherein the changing device is preferably movable between at least two different positions—in particular by a mobile robot.

In contrast to the prior art, which provides changing devices for a blow molding machine, for example, it is proposed within the scope of the present invention to provide a uniform changing device which can change both changeable elements and in particular format parts of the forming device as well as changeable elements and in particular format parts of the heating device.

In a preferred embodiment, the heating device and the forming device are positioned at different locations. Thus, for example, these components can be arranged at different positions in a machine hall and the plastic preforms are first transported through the heating device and subsequently to and/or through the forming device.

The at least one heating unit is preferably arranged in a stationary manner and the plastic preforms are transported past this. For example, these can be infrared heating units which, for example, have radiant heaters for heating the plastic preforms.

In a preferred embodiment, the transport device is designed to be circulating. For example, the transport device can have a transport chain on which a plurality of holding devices for holding the plastic preforms is arranged. Preferably, the transport device transports the plastic preforms at least in portions along a straight transport path and at least in portions along a curved and in particular circularly curved transport path.

The heating units are preferably infrared heating units. However, the use of microwave heating units would also be conceivable.

In a preferred embodiment, the holding devices are holding mandrels which can be inserted into the mouths of the plastic preforms. These holding mandrels are particularly preferably rotatable so that the plastic preforms can be rotated with respect to their longitudinal axis during their heating.

Particularly preferably, the heating device also has a plurality of heat shielding elements which are suitable and intended to avoid excessive heating of the mouth regions of the plastic preforms. As is known, in the prior art only the main bodies of these plastic preforms are heated, but not their threaded portions or their mouths. These remain substantially unchanged. For this reason, it is advantageous if the heat which serves to heat the plastic preforms on their main bodies does not reach the mouths, since they would otherwise be deformed. Advantageously, at least one such shielding device is assigned to each holding device.

Particularly preferably, the forming stations each have changeable blow molds. These blow molds are preferably designed in several parts and preferably have two side parts and a bottom part. These blow molds thus form a hollow space which serves to expand the plastic preforms. In a further advantageous embodiment, the forming stations also each have application devices and in particular blow nozzles. These can be applied to a mouth of the plastic preforms in order to thus apply the flowable medium to them. In a further advantageous embodiment, the forming stations each have so-called stretching rods that can be inserted into the interior of the plastic preforms to stretch them in their longitudinal direction. Both the blow molds or the blow mold parts are particularly preferably such changeable elements or elements to be changed as mentioned above.

Particularly preferably, the changing device has a changing robot for changing the changeable elements. This robot can, for example, as described in greater detail below, be a multi-axis robot which has a gripping device for gripping the changeable element to be replaced in each case.

In a further preferred embodiment the changing device has a movable carrier, as well as a first robot unit, which is also referred to below as a changing device and which can be mounted on this carrier. Furthermore, the changing device optionally has a further robot device which serves to arrange the first robot unit on the carrier. The first robot unit can preferably be equipped with several gripping devices, for example a gripping device for gripping blow molds and a gripping device for gripping holding mandrels and shielding plates or for gripping receiving devices which are intended for storing heating mandrels and/or shielding plates. In addition, the changing device can also have one or more magazine devices, as described in greater detail below.

It is possible, for example, that the actual handling robot (changing device) be picked up by a mobile robot (AGV—automated guided vehicle or AMR—autonomous mobile robot), for example by being driven under, and for example by means of a lifting unit, and be set down at different positions.

In an advantageous embodiment, the changing device is movable between a first position, in which it is positioned for changing changeable elements of the heating device, and a second position, in which it is positioned for changing changeable elements of the forming device. Preferably, the changing device or a component of the changing device can be positioned and/or fastened at the respective positions, wherein docking stations described in greater detail below can be arranged at these positions, which docking stations enable a fastening and/or a data connection and/or an energy supply and/or a compressed air supply between the changing device and this docking station. In this way, the changing device can also be integrated on the control side into the respective system parts, such as in particular the heating device and the forming device.

The present application is preferably based on a basic technology of a mobile robot system, which particularly preferably comprises changeable attachments or gripping devices. In addition, ideas can also be taken into account which have been previously described only in the material supply, for example in labeling machines.

In a further advantageous embodiment the system has at least one further transport device which transports the heated plastic preforms from the heating device to the forming device. Preferably, this at least one further transport device is at least one transport starwheel or has at least one transport starwheel.

In a further advantageous embodiment the changeable elements of the heating device are selected from a group of changeable elements and in particular format parts, which includes gripping clamps, holding mandrels, shielding plates for heat shielding, and the like. In a further advantageous embodiment the changeable elements of the forming device are selected from a group of changeable elements and/or format parts which includes gripping clamps, blow molds, blow mold parts, stretching rods, blow nozzles and the like.

In a further advantageous embodiment the changing device has at least one gripping device for gripping the changeable element. Preferably, this gripping device is changeable and can be replaced in particular depending on the changeable element to be replaced.

In a further advantageous embodiment the changing device can be equipped with at least two different gripping devices, wherein one of the gripping devices is preferably intended for changing a changeable element of the heating device, and the other of the gripping devices is intended for changing a changeable element of the forming device. In this way, the same changing device can be used both for changing format parts of the heating device and for changing format parts of the forming device.

The system described here for (fully) automatic changeover of the elements to be changed, in particular the heating mandrels and shielding plates on the heating device, and for fully automatic changeover of changeable elements and in particular blow molds on the forming device has a mobile robot (and/or a mobile platform), a changeable attachment, in particular with an articulated arm robot for handling the heating mandrels, shielding plates and blow molds, and one or several mobile transport units and/or magazine devices for storing the heating mandrels and shielding plates and for storing blow molds. The mobile robot or the mobile platform can, in particular but not exclusively, be an AGV (automated guided vehicle) or a FTS (driverless transport system) or an AMR (autonomous mobile robot).

The changeover attachment and the mobile transport units can be picked up by the mobile robot. In addition, the changeover attachment (possibly with articulated arm robot in the docking station) can optionally be centered and fixed by means of different docking stations (in order to guarantee a repeat accuracy and/or to allow dynamic forces to be reliably dissipated) and the mobile transport units can be centered and possibly fixed in the docking station.

In a further advantageous embodiment the changing device can also be equipped with different gripping devices for different elements of the heating device and/or the forming device.

The top unit or the changing device preferably has a frame rack. Mounted thereon is preferably a multi-axis, in particular an at least three-axis, preferably an at least four-axis, preferably an at least five-axis and in particular a six-axis manipulator. The manipulator is preferably equipped on the hand axis with a gripper system and in particular with a gripper changing system. It is thus possible to equip the manipulator with different gripping devices for different changeable elements, in particular both with a gripper for blow molds and with a gripper for heating mandrels and shielding plates. The grippers are preferably changed using a commercially available fully automatic gripper changing system on the wrist of the manipulator.

In the case of a further advantageous embodiment the changing device has a mobile carrier on which a robot device is arranged. This mobile carrier can be or can have the above-mentioned frame rack which can move on rails, for example. However, it would also be possible for the mobile carrier to be freely movable in space. The robot device can be a multi-axis, for example a six-axis robot or manipulator. Particularly preferably, the robot is an articulated arm robot.

In a further advantageous embodiment, the system and in particular the changing device has at least one magazine device for storing changeable elements, wherein this magazine device is preferably also designed to be mobile. The term "mobile" is understood here in particular to mean that this magazine device can be moved by a user between at least two positions and/or that the magazine device can be moved by a mobile robot (AGV).

Preferably, this magazine device can also be reached by the robot or can be carried along by the robot frame, for example. This magazine device can accommodate, for example, a plurality of changeable elements such as a plurality of heating mandrels. The system preferably has several magazine devices which are preferably designed for different changeable elements. In a preferred embodiment, the magazine device is designed as a drawer magazine, i.e., the compartments of the magazine device can be pulled out.

The transport unit and/or magazine device for heating mandrels and shielding plates preferably has a frame rack on which a drawer magazine preferably having several drawer modules is mounted. The frame rack is preferably designed in such a way that the top unit or the changing device can be placed at any locations or on a docking station.

Per drawer module, preferably at least 10 and preferably up to 50 receptacles each with five heating mandrels and shielding plates can be accommodated. For this purpose, a plate, preferably made of plastic, is attached in the drawer module, said plate having recesses into which the receptacles can be placed form-fittingly.

The heating mandrels and shielding plates in the magazine device are preferably shielded from the surrounding environment on three sides by covers. They can thus be protected against contamination and damage. If necessary, the remaining open side can also be closed by a roller gate, for example. The stored heating mandrels and shielding plates are also preferably protected from above by a cover.

For opening the drawer modules, handles are preferably attached to them, in particular a commercially available handle for manually opening the module. In addition, a handle can be provided which is designed such that it can be gripped by the gripping device described above.

The drawer module preferably has two pull-out rails, wherein particularly preferably one is secured in its end positions. The unlocking of the end-position securing means can particularly preferably be actuated by the above-described gripping device on the handle.

The frame rack can be placed on the docking station described below by centering elements and centered in the position or can be placed freely on the floor by machine feet.

In addition, there is alternatively the possibility that the substructure of the drawer magazine is omitted and is replaced by such a receptacle that the drawer module can be transported manually (lifting truck, forklift truck) or by a forklift AGV. In this case, the transport unit can also be set down again on the floor or, for centering, on a docking station.

The transport unit or magazine device for the blow molds preferably has a transport frame and a blow mold magazine. The frame rack is advantageously designed in such a way that the top unit or the changing device can be placed at any locations or on a docking station.

The blow mold magazine mounted on the transport frame is preferably designed as a blow mold magazine known from the internal prior art for stationary blow mold changing robots. For transporting different blow molds, the magazine is available in various embodiments (for example for blow molds of outer diameter 160 mm or 125 mm). In a magazine, preferably up to 36 blow molds can be stored.

Like the above-described transport unit for heating mandrels and shielding plates, the frame rack can be placed on the docking station described below by centering elements and centered in the position or can be placed freely on the floor by machine feet.

In addition, there is alternatively, similarly to the above-described magazine device, the possibility that the substructure of the blow mold magazine is omitted and is replaced by such a receptacle that the blow mold magazine can be transported manually (lifting truck, forklift truck) or by a forklift AGV. In this case, the transport unit can also be set down again on the floor or, for centering, on a docking station.

In the simplest case, the gripping device is made up of several machining parts, these being preferably connected to one another. Depending on the accuracy requirement, the basic structure of the gripping device can, however, also consist of or have a solid machining part. The gripping device can be connected directly to a robot by means of a flange or to an adapter for a quick-change system.

The heating mandrels and shielding plates are provided in a receptacle or a magazine device, which is inserted by the gripper into a changing device on the heating module, i.e., the heating device, or removed therefrom. The gripping device preferably holds the receptacles with the heating mandrels and shielding plates firmly by means of a form-fitting and/or frictionally engaged connection (alternatively exclusively form-fittingly or exclusively with frictional engagement). For this purpose, an actuator, in particular a pneumatic actuator, is attached to the gripping device. A movable gripper jaw is connected thereto.

The fixed gripper jaw is attached by the robot to the receptacle in such a way that it touches the robot; to detect the contact, if necessary, a contact sensor installed on the fixed gripper jaw can be used, but this is not absolutely necessary.

The movable gripper jaw is preferably moved towards the receptacle with the aid of the (in particular pneumatic) actuator and clamps it. In addition, identification of the shielding plates and heating mandrels (e.g., sorting assignment) can be made possible via a marking, for example an RFID tag on the receptacle by a sensor device, for example an RFID sensor on the gripping device.

The gripping device for blow molds is already used in the internal prior art of the applicant. The gripping device can be mounted directly on a robot, in particular an articulated arm robot or on an adapter for a quick-change system by means of the fastening flange.

A fork, a retaining plate and guide pins and the pneumatic cylinders are used for the preferably form-fitting and frictionally engaged gripping of the blow molds. The sequence during gripping of a blow mold is described in greater detail below. The transport unit described further below for the blow molds can be checked by a sensor device, in particular an RFID read head. In addition, it is also possible for elements such as, in particular, the blow molds to be identified. For this purpose, these can have an RFID tag, for example.

In a further advantageous embodiment the system has at least one stationary fastening station and/or docking station on which at least one component of the changing device can be arranged. In a preferred embodiment, this docking station has an electrical and/or mechanical and/or fluidic interface to which the changing device can be connected. In a preferred embodiment, the apparatus has fastening elements in order to achieve a mechanical fastening of the changing device on this docking station.

Centering and/or clamping elements are preferably attached to the frame and, in particular, to the underside of the frame, i.e., the above-mentioned frame rack, in order to fix the latter during the working of the manipulator on the docking station and to prevent tipping or the like through the resulting dynamics.

The changing device can also be fixed on the mobile robot by means of centering and clamping elements. Thus, the manipulator changing attachment can be operated on the docking station or also on the mobile robot. By means of an optional plug connection, the voltage and pneumatic supply of the changing attachment and the exchange of signals can be produced. Alternatively or additionally, the energy supply or the data exchange could also take place, for example wirelessly via induction or WLAN.

If necessary, there can be mounted on the changing device a tool magazine, in which the grippers for the robot applications can be transported and stored or picked up in the case of a gripper change. At least one switch cabinet is preferably arranged on the changing device; components for controlling the manipulator are fastened therein. The docking station preferably has a base frame. The components required for the docking process described below can be fastened on this base frame. These include centering elements, lifting units and a strip in triangular form.

For fine positioning of the mobile robot for the forming device, for example by means of a triangle drive, a strip with a triangular contour is preferably used on the end face. Other shapes would also be conceivable. The exact position of the strip is variable. In principle, other methods of fine positioning would also be conceivable, for example by means of camera and QR codes.

In the case of a triangle drive, a scanning device and in particular a laser scanner (of the mobile platform) is preferably provided, which detects a triangular contour and can achieve precise positioning on the basis of this contour.

Lifting units, for example four lifting units, are preferably used to take over the changing device or the magazine devices. These are shown, for example, below in FIG. 11 (reference sign 106). The changing device or the magazine device can thus be received. The lifting units can be discharged, so that the top unit or transport unit can also be transferred to the docking station in the event of an uneven ground surface. Thus, an uneven ground surface and an offset of the changing device or the magazine devices can be compensated in different forms. Changing devices which have to be fixed during their activity due to a resulting dynamics can be fixed by clamping elements (preferably pneumatically) on the docking station.

The docking station is preferably anchored on the floor with three or if necessary also with several leveling elements. By means of the elements, the docking station can be aligned flat during assembly.

If necessary, the docking station can have a multi-plug connector so that working media such as compressed air can be transmitted. However, individual (plug) connections could also be provided. An electrical energy supply of a remote top unit can thus also be made possible. A data transmission can thus also be realized. Alternatively, wireless data transmission systems such as WLAN can also be considered. The energy supply could also be ensured by charging contacts or by an inductive charging system.

In a further advantageous embodiment the system has at least one identification device in order to identify at least one changeable element. Furthermore, the system preferably has at least one detection device which enables the position determination of at least one element of the changing device and/or of a changeable element. Preferably, the changeable element can be unambiguously identified. This can take place, for example, via a marking such as an RFID tag. Furthermore, a camera system (for example a 2 or 3D camera technology) can be installed (for example on the manipulator and/or the robot), which enables the robot to determine the position of the heating mandrels and shielding plates in the automatic changing machine or in the transport unit. The position of the blow molds can also be determined by a camera system. Thus, the centering in the docking station or even the docking station itself can be omitted for the transport units. In addition, a camera system can check the heating mandrels, shielding plates or blow molds for damage or correct sorting assignment (for example via RFID tags in the blow molds).

The top unit is preferably designed in such a way that it can be used for the greatest possible utilization also for other activities, in other areas of a system. This can be, for example, a label roll change by means of mobile robots.

The present invention is further directed to a method for operating a system for producing plastic containers, wherein plastic preforms are heated with a heating device in a working mode of the system, and wherein a transport device transports the plastic preforms along a predetermined first transport path, and a plurality of holding devices holds the plastic preforms, and at least one heating unit heats the plastic preforms during their transport, and wherein furthermore a forming device expands the plastic preforms heated by the heating device by applying a flowable (and in particular gaseous) medium (in particular compressed air) and thus forms them into the plastic containers. In this case, the forming device has a plurality of forming stations which form the plastic preforms into the plastic containers and furthermore both the heating device and the forming device have changeable elements and/or changeable format parts (which serve in particular for switching to different container types).

According to the invention, a changing device changes both changeable elements of the heating device and changeable elements of the forming device in a changeover mode, wherein the changing device is moved between at least two different positions—in particular by a mobile robot. This change is preferably carried out fully automatically.

It is therefore also proposed in terms of the method that the same changeover device at least also changes change parts or changeable elements of the forming device and also of the heating device.

In a preferred method, the changing device is also equipped with different gripping devices and/or changing units in order to be able to carry out or to can carry out the change of changing parts (or changeable elements) of the forming device and the change of changing parts (or changeable elements) of the heating device.

Particularly preferably, the changing device is at least temporarily moved or components of the changing device are moved from a first position, which serves to change changeable elements of the forming device, into a second position, which serves for changing changeable elements of the heating device.

Particularly preferably, changing elements or changeable elements are stored at least temporarily in a magazine device. In a preferred method, this magazine device is also moved at least temporarily into different positions.

In a further preferred method, the changing device or a component of the changing device is at least temporarily positioned and/or fastened to a docking station. This docking station is preferably assigned to the forming device or the heating device and/or is arranged in a region from which it is possible to carry out changes of changeable elements of the heating device or the forming device.

An exemplary sequence of a change of heating mandrels and/or shielding plates of a heating device is preferably configured as follows. It is pointed out that not necessarily all of the subsequent steps are mandatory.

The mobile robot receives the robot top unit, i.e., the actual changing robot, and enters the heating module of the stretch blow molding machine or enters the heating device.

The changing robot (also referred to below as the robot top unit) is deposited on the heating device and is preferably placed on the docking station. In this case, it is preferably aligned, centered and connected thereto (preferably a voltage supply is produced by a data connection and/or a media connection).

The mobile robot moves to the transport unit or the magazine device, picks it up and moves it preferably to a docking station on the heating device, which is preferably positioned next to the docking station for the robot top unit. The magazine device is placed on the docking station. This is preferably aligned and/or centered in its position.

Alternatively, it would also be conceivable for the magazine device for heating mandrels/shielding plates to be brought to the docking station by another AGV type (e.g., forklift AGV). In addition, it is also conceivable for the magazine device to be set down without a docking station. It is also conceivable that a unit for storing the heating mandrels/shielding plates is present on or in the machine.

In a further step, the robot top unit opens a drawer on the transport unit and, with the aid of the gripping device, removes a receptacle with heating mandrels and shielding plates from the heating module and positions them in the open drawer.

The robot preferably grips, with the aid of the gripping device, a receptacle with heating mandrels and shielding plates from the drawer and supplies them to the changing device in the heating device. The last two steps are repeated until all necessary heating mandrels and shielding plates which are mounted in the open drawer of the transport unit have been changed.

In a further step, the drawer of the transport unit is closed, in particular by the robot top unit. Subsequently, another drawer of the transport unit can be opened by the robot top unit. The heating mandrels and/or shielding plates located therein are likewise changed by the robot top unit until all necessary heating mandrels and shielding plates are changed. Subsequently, the drawer (in particular by the robot top unit) is preferably closed.

The described sequences are repeated until all heating mandrels and shielding plates in the heating module have been changed. The mobile robot then moves the transport unit to its parking space and releases it. Preferably, the mobile robot then moves the robot top unit to its parking space or possibly to another place of work and is ready for further and possibly also other activities (e.g., label roll changes).

The change of the blow molds is simplified as follows:

The mobile robot receives the robot top unit and enters the forming device. The robot top unit is preferably placed on the docking station at the forming device. In this case, it is preferably aligned, centered and/or connected thereto (wherein in particular a voltage supply, a data connection and/or media connection is produced).

The mobile robot moves to the transport unit or magazine device for blow molds and is preferably moved to a docking station which is positioned next to the docking station for the robot top unit.

The (transportable) magazine device for blow molds is placed on the docking station. This is preferably aligned and/or centered in its position.

Alternatively, it is also possible for the magazine device to be brought to the docking station for blow molds by another AGV type (e.g., forklift-AGV) and for the magazine device to be set down without docking station. In addition, it is also conceivable for the system and in particular the forming device to have a unit for storing the blow molds on or in the apparatus.

The subsequent steps proceed as in the case of a stationary blow mold changing robot. First, the blow molds are (optionally) checked in the magazine device (in particular by the robot top unit) (in this case a position and/or an occupancy of the magazine places can be detected and the numbers of the blow molds can be detected (e.g., via RFID tag).

In a further step, protection of the blow molding machine is opened (in particular automatically). The blow mold carrier is positioned within the blow molding machine for the change (which can take place for example by changing a rotational position of the rotatable carrier on which the forming stations are arranged). In a further optional step, a centering and/or compressed air supply of the blow mold carrier is produced.

Furthermore, the blow mold is gripped by the robot top unit and the blow mold is unlocked in the blow mold carrier. In a further step, the blow mold carrier is opened and the blow mold is thus released. The blow mold is removed by the articulated arm robot on the robot top unit. Subsequently, the blow mold is placed in the magazine device for the blow molds and the gripping device for the blow molds is released again from the blow mold.

Subsequently, a new blow mold is gripped from the transport unit and the blow mold is positioned by the robot, in particular an articulated arm robot, in the blow mold carrier. Lastly, the blow mold carrier is closed and the blow mold is locked in the blow mold carrier. Finally, the gripping device is released for the blow molds.

The system control checks whether the change of the blow molds at the system is complete. If the change is not complete, the next blow mold carrier is positioned and the described processes are repeated until all blow molds are changed. The mobile robot moves the magazine device to its parking space and releases it.

The mobile robot moves the robot top unit to its parking space or possibly to another place of work and is ready for further and possibly also other activities (e.g., label roll changes).

Further advantages and embodiments can be seen in the accompanying drawings:

BRIEF DESCRIPTION OF THE DRAWINGS

In the drawings:

FIGS. 17*a*-17*d* show four representations to illustrate a gripping operation for heating mandrels and shielding plates;

DETAILED DESCRIPTION OF THE INVENTION

Figure 1:
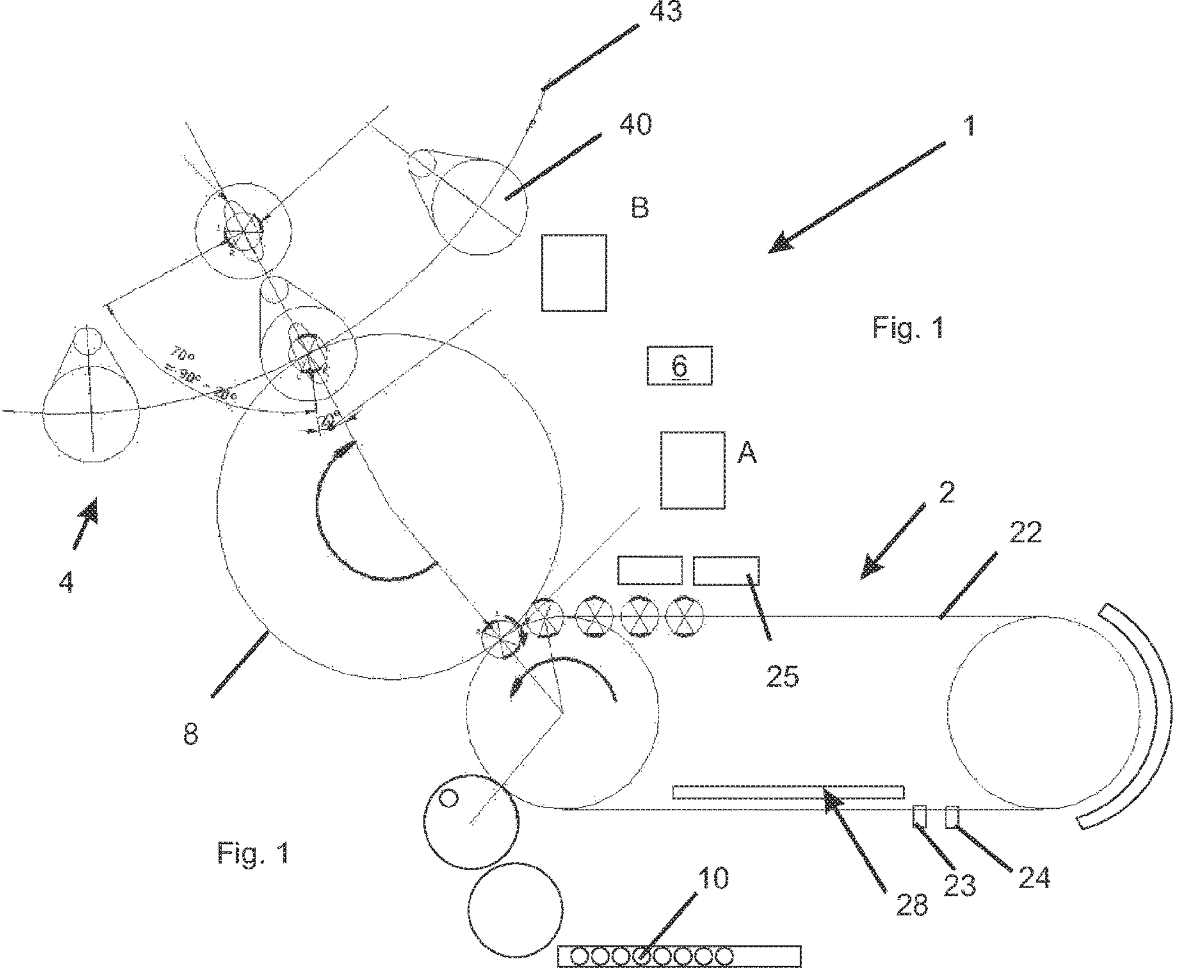
FIG. 1 shows a schematic representation of a system according to the invention for producing plastic containers.

FIG. 1 shows a schematic representation of an apparatus 1 according to the invention for producing containers. In this case, plastic preforms 10 are first fed to a heating device 2 in order to be heated thereby.

This heating device 2 has a circulating transport device 22 on which a plurality of holding devices 24 (shown only schematically) for holding the plastic preforms are arranged. These holding devices can be, for example, holding mandrels which engage in the mouths of the plastic preforms.

Reference sign 28 denotes a rotating device which effects a rotation of the individual plastic preforms with respect to their longitudinal directions.

Each of these holding devices 24 is assigned a shielding device 23, which prevents the mouth regions of the plastic preforms from overheating. The holding devices 24 and the shielding devices 23 and in particular shielding plates are in particular changing parts which can be exchanged during a format change.

The reference sign 25 identifies heating devices, such as infrared emitters, which are arranged laterally next to the transport path of the plastic preforms 10.

A transport device 8 transports the heated plastic preforms from the heating device 2 and guides them to a forming device 4, in particular a stretch blow molding machine. This forming device 4 preferably has a rotatable carrier 43, in particular such as a so-called blow wheel, on which there is arranged a plurality of forming stations 40.

Reference sign 6 denotes roughly schematically a changing device which is movable between a first position A (in which it serves for changing parts to be changed of the heating device 2) and a second position B (in which it serves for changing parts to be changed of the forming device 4).

Figure 2:
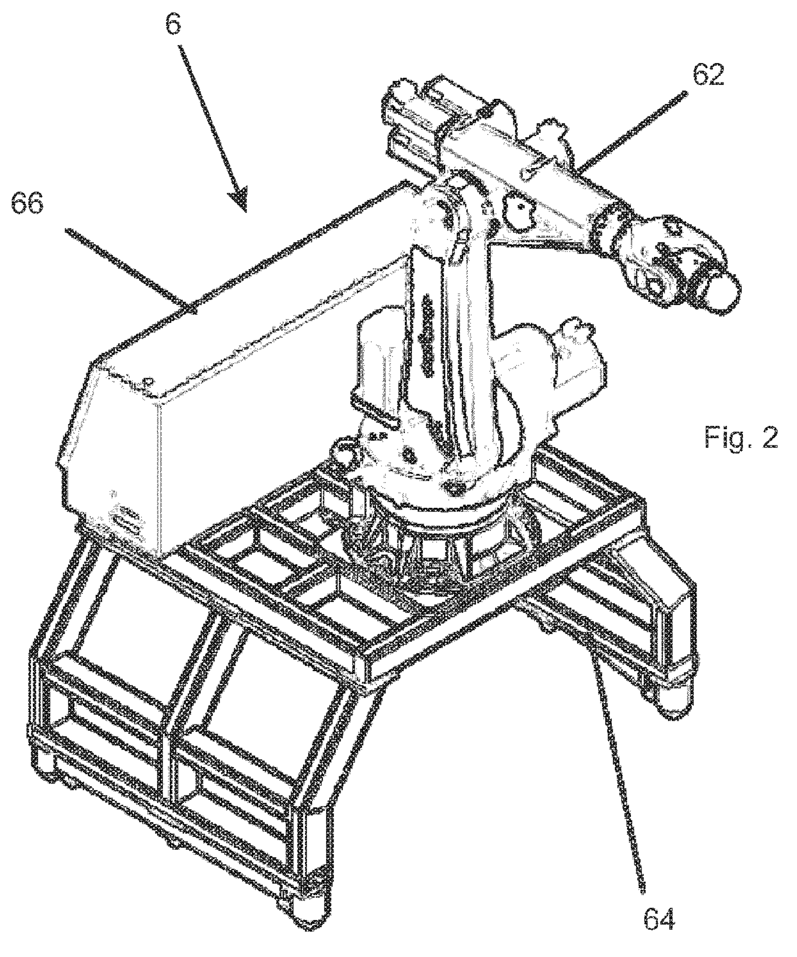
FIG. 2 shows a first representation of a changing device.

FIG. 2 shows a representation of a changing device 6. This has a changing robot 62 (also referred to as changing device), which is fastened to a transport frame or generally to a frame or carrier 64. The complete changing device 6 can preferably be moved with the mobile robot, for example moved from position A to position B.

This robot is preferably designed as a multi-axis robot, in particular as a six-axis robot.

Reference sign 66 indicates a control device for controlling the changeover robot 62. The frame 64 is movably arranged, in particular by means of a movable robot, but can also be movably arranged relative to a rail system. In addition, this frame 64 is also able to be fastened to a docking station. The frame or the carrier is preferably designed in such a way that a tilting or the like cannot occur even when strong weights are picked up.

This changing device 6 is particularly preferably designed in such a way that it can also be used in other machines or plant parts, for example in filling machines or labeling machines.

In a particularly preferred embodiment, the changing device or the changing attachment can be inserted on the stretch blow molding machine at a position A and B and can be moved there between these positions, preferably generally but still to other positions (for example on a further stretch blow molding machine or labeling machine, etc.). In particular, however, this movability takes place by means of a mobile robot.

It can also be used in the complete line (inspection, etc.).

Figure 3:
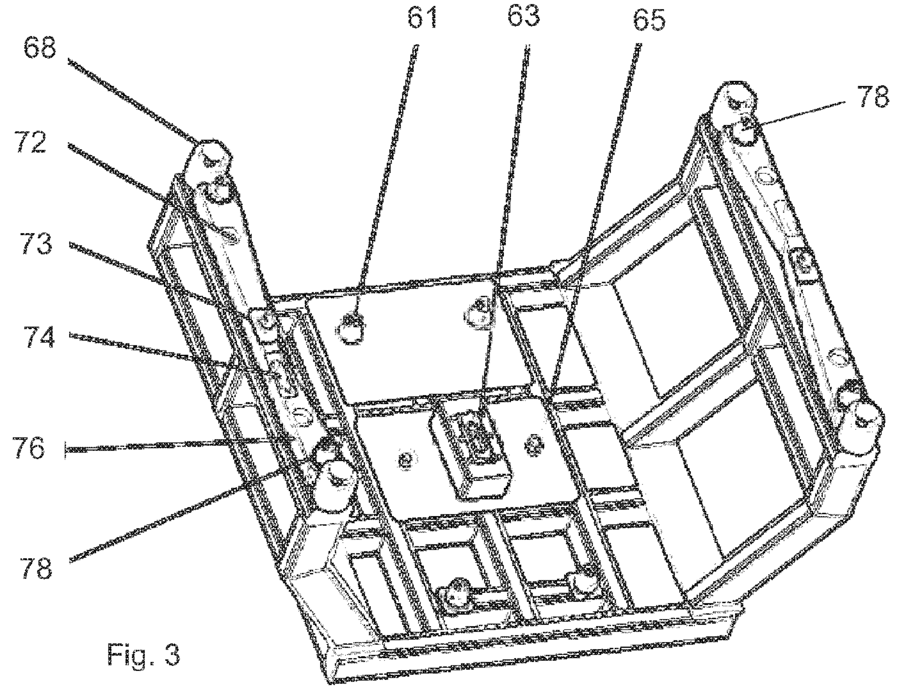
FIG. 3 shows an underside of the changing device shown in FIG. 2.

FIG. 3 shows an underside of the changing device shown in FIG. 2. The reference sign 68 relates to a machine foot, by means of which the carrier 64 can, for example, be set down on a floor, but also on a docking station. This machine foot 68 is preferably elastic in order to enable a gentler setting down of the changing device on a substrate in this way.

Reference sign 78 denotes a centering device, such as a centering pin. By means of this centering device, precise positioning can be performed, for example relative to a docking station. Several such centering devices, here four devices, are preferably provided here. Reference sign 76 denotes a strip, preferably with a triangular contour, for fine positioning by means of a triangle drive (i.e., fine positioning by means of the laser scanners and a reference contour).

The reference sign 74 denotes an electrical connection device, such as, in particular, but not exclusively, a multi-plug. The apparatus preferably also has a fastening means, such as the clamping pin 73, in particular in order to achieve a fastening on a docking station.

The reference sign 72 denotes a socket and in particular a socket with play, which, when arranged on a docking station, allows a certain small freedom of movement or a certain play, in particular in order to be able to better absorb the loads which occur in this way. Furthermore, centering pins 61 are also preferably provided, which interact with corresponding counter pieces of a docking station. These centering pins 61 serve for centering the changing device on the mobile robot. The elements 78 serve for centering on the docking station.

Reference sign 63 denotes a further optionally present multi-plug, which, for example, can produce electrical connections or also fluid connections to the mobile robot. Furthermore, an optional clamping pin or a clamping device 65 can be provided, which also serves for locking with respect to a docking station (not shown).

Figure 4:
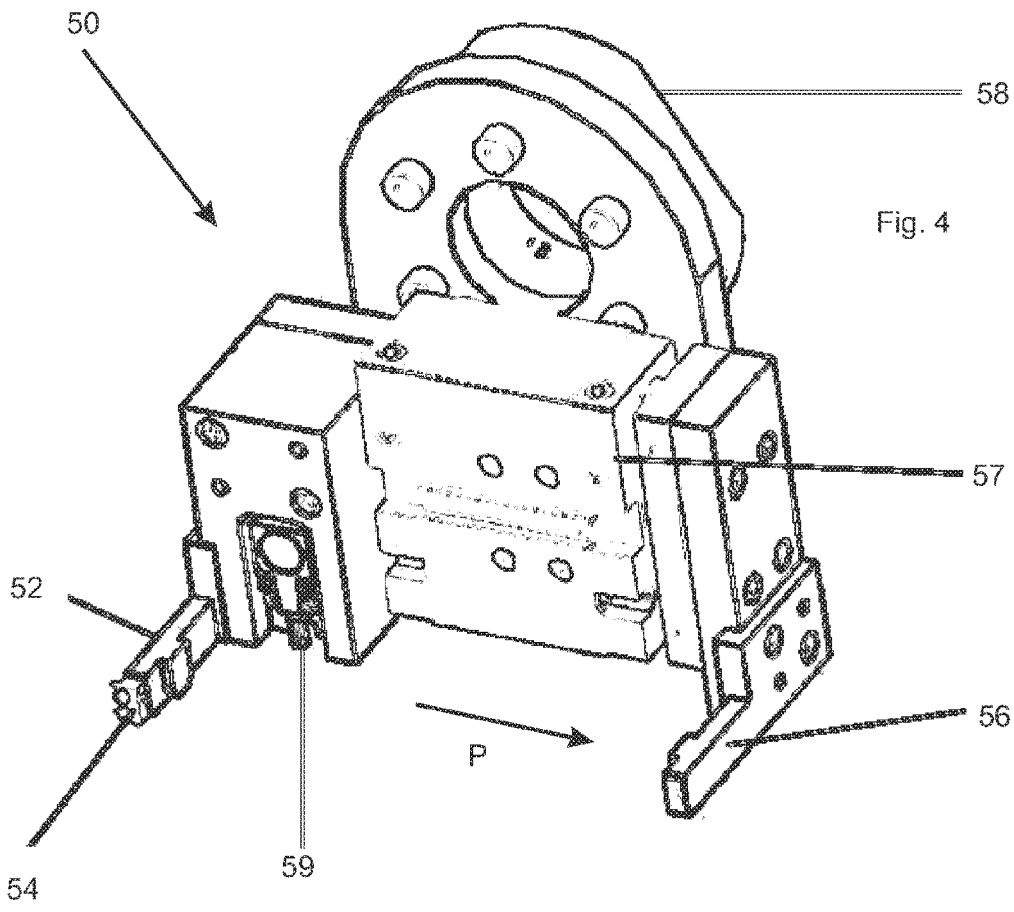
FIG. 4 shows a representation of the gripping device for gripping heating mandrels.

FIG. 4 shows an illustration of a gripping device 50 for heating mandrels and shielding plates. Reference sign 52 denotes here a fixed gripper jaw which serves to grip elements. Reference sign 54 denotes an optionally present contact sensor which serves to determine whether an object such as a magazine is being held. Reference sign 55 denotes an optional detection device which is suitable and intended to identify a held magazine. In particular, this can be an RFID reading head.

Reference sign 56 denotes a movable gripper jaw, in particular a gripper jaw movable in the direction of the arrow P and also in the opposite direction. In this way, an article such as a magazine can be gripped. Reference sign 58 denotes an adapter device for the tool changing system. By means of this adapter device, the gripper 50 can be fastened to a robot arm (not shown).

Reference sign 57 denotes a drive device in order to move the movable gripper jaw 56. In particular, the drive device is a pneumatic drive device. However, the use of an electric drive device or a magnetic drive device would also be possible.

Figure 5:
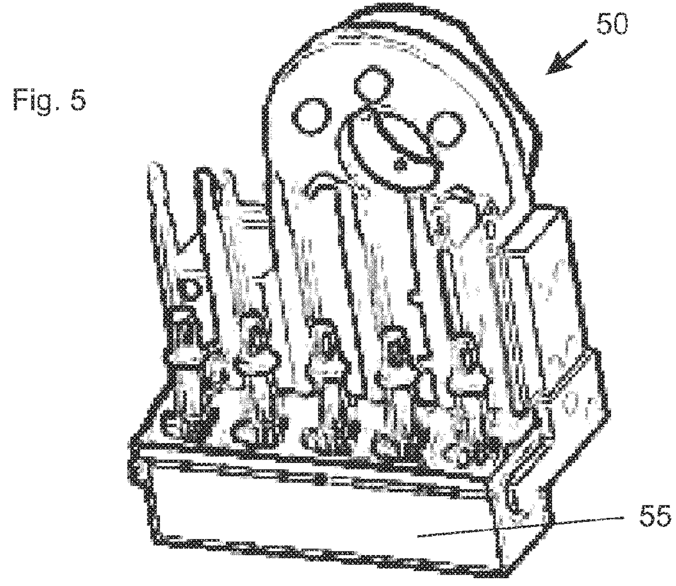
FIG. 5 shows a representation of the device from FIG. 4 with a set of heating mandrels.

FIG. 5 shows a gripping device 50 with a magazine device 55 arranged thereon for storing shielding plates or holding mandrels. The magazine device 55 can be inserted into a changing device, for example on the heating device, and can be removed therefrom.

Figure 7:
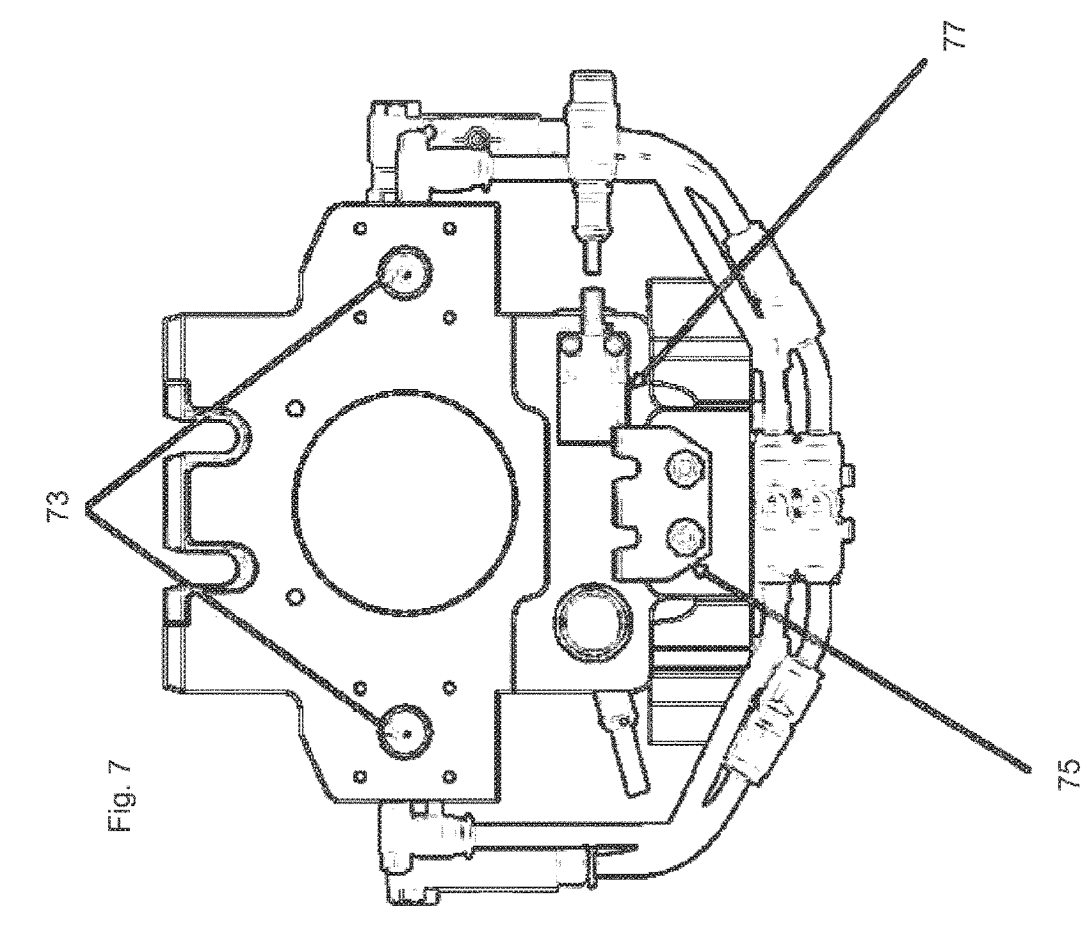
FIG. 7 shows a further view of the device from FIG. 6.
Figure 6:
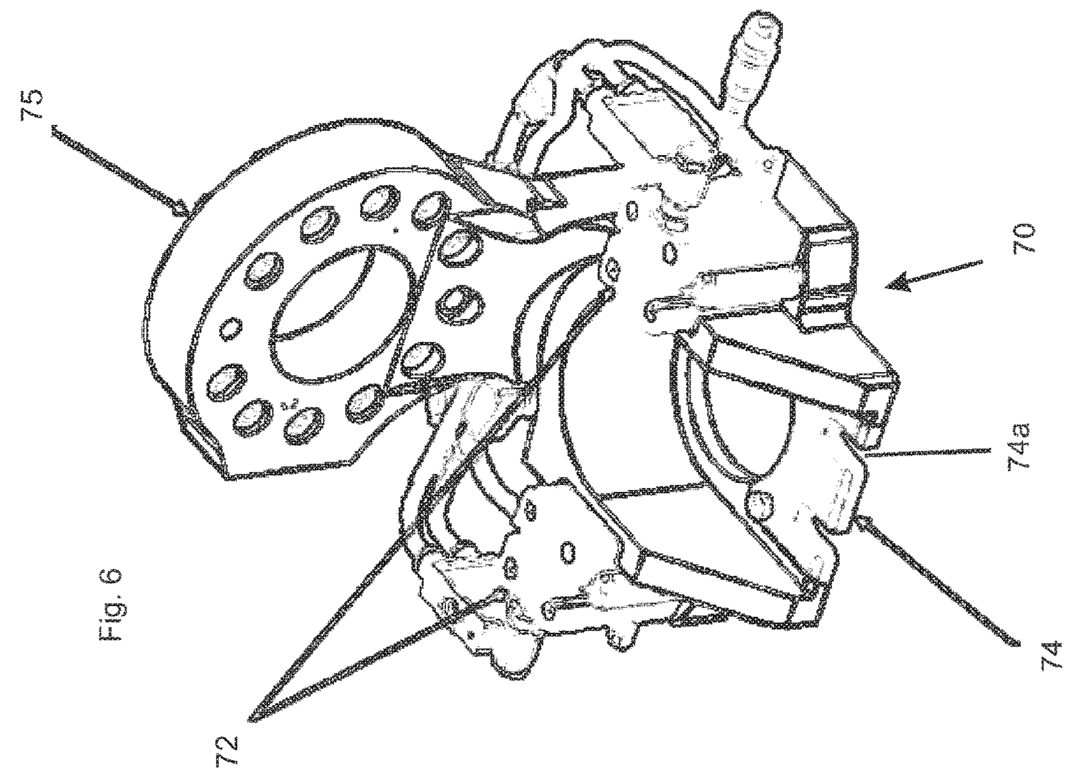
FIG. 6 shows a representation of a gripping device for gripping blow molds.

FIGS. 6 and 7 show a gripping device for blow molds. Here, reference sign 75 also relates to a fastening device and in particular a fastening flange for fastening to a robot arm. The reference sign 74 denotes a receiving device and in particular a receiving fork for receiving blow molds. The blow molds here can have two pins or projections which can be gripped by the recesses of this fork device 74.

Reference signs 72 denote drive devices for gripping or moving the fork device.

FIG. 7 shows a view from below of the gripping device shown in FIG. 6. In this case, reference sign 73 denotes guide devices and in particular guide pins which serve for gripping blow molds. Reference sign 75 denotes a holding device and in particular a holding plate. Reference sign 77 denotes an optional detection device for detecting a blow mold. This can again be an RFID reading head, for example.

Figure 8:
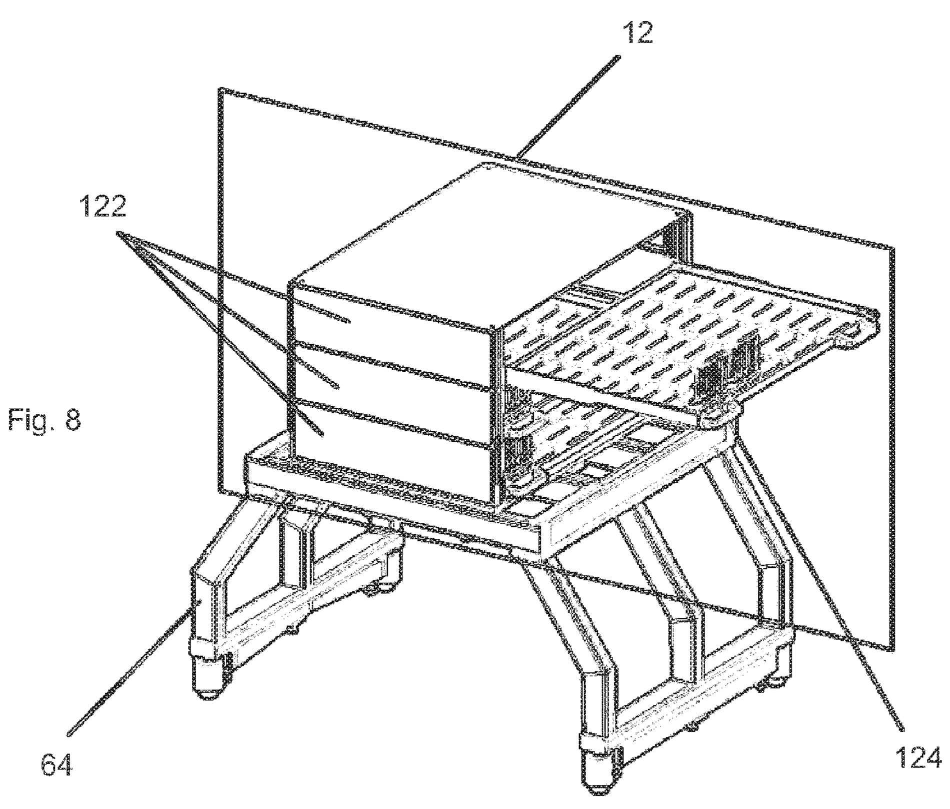
FIG. 8 shows a movable magazine device.

FIG. 8 shows a representation of a magazine device 12 for receiving heating mandrels and shielding plates. Reference sign 122 denotes drawer modules in which the changeable elements can be stored in each case. This magazine device 12 is arranged on a carrier or a transport frame 64. Reference sign 124 denotes a receiving device, wherein here two receiving devices (for receiving shielding devices and/or holding mandrels) can be seen, which are arranged in this receiving device 124.

Figure 9:
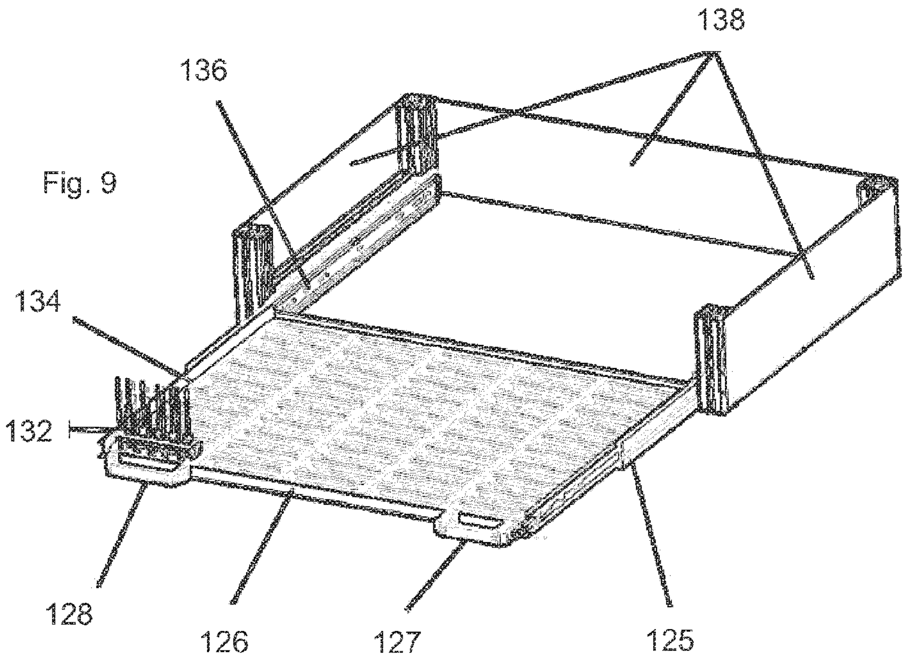
FIG. 9 shows a detailed representation of the magazine device shown in FIG. 8.

FIG. 9 shows a more detailed representation of a receiving device 122. This has three side walls or covers 138. Reference sign 136 denotes a pull-out rail, by means of which a plate is displaceable, in particular a plastic plate 134.

The reference signs 127 and 128 denote a handle which can be gripped by a user and/or by a robot. At this point, an unlocking means for unlocking the drawer is preferably also provided. In addition, locking means are also optionally provided which, for example, limit or prevent removal of the drawer-like design beyond a certain degree. Reference sign 132 denotes a receptacle with holding mandrels and shielding plates. Reference sign 125 denotes a pull-out rail with optional locking means.

Figure 10:
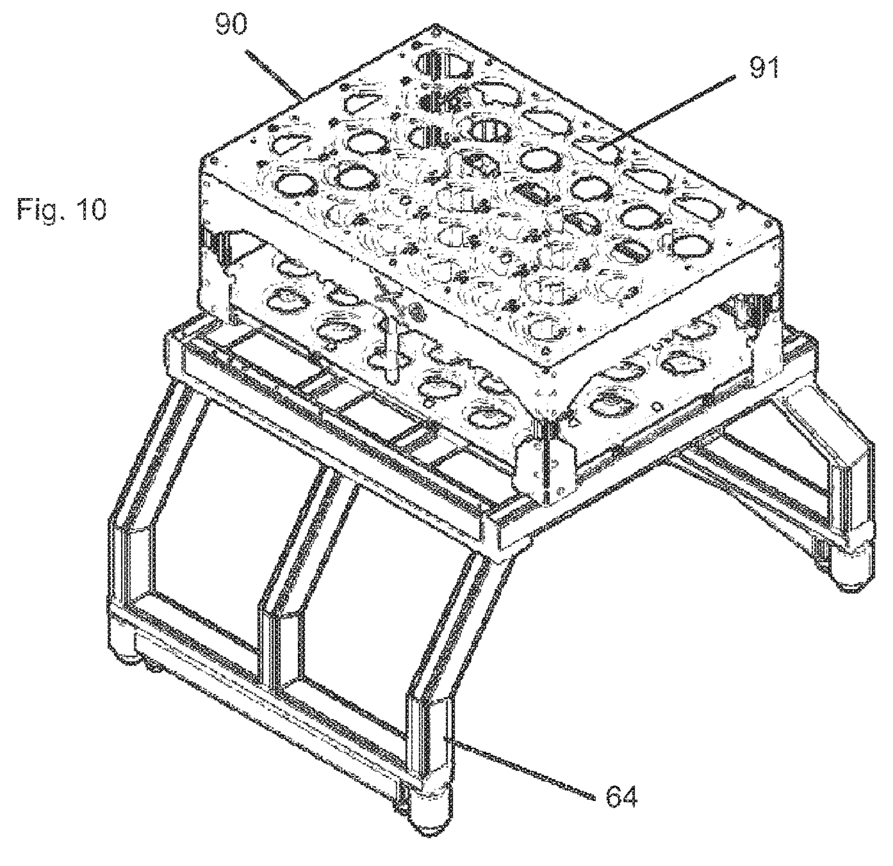
FIG. 10 shows a representation of a unit for receiving blow molds.

FIG. 10 shows a magazine device 90 for blow molds (not shown). This has a plurality of receiving devices or receiving recesses 91, which can serve for receiving blow molds in an assembled state or also for receiving blow mold parts, such as their side parts. Reference sign 64 again denotes the frame or the rack on which the magazine device 90 is arranged. In this way, the magazine device can also be moved. As mentioned above, this frame can also have carrier elements or the like in order to be positioned at a further location, for example a docking station.

Figure 11:
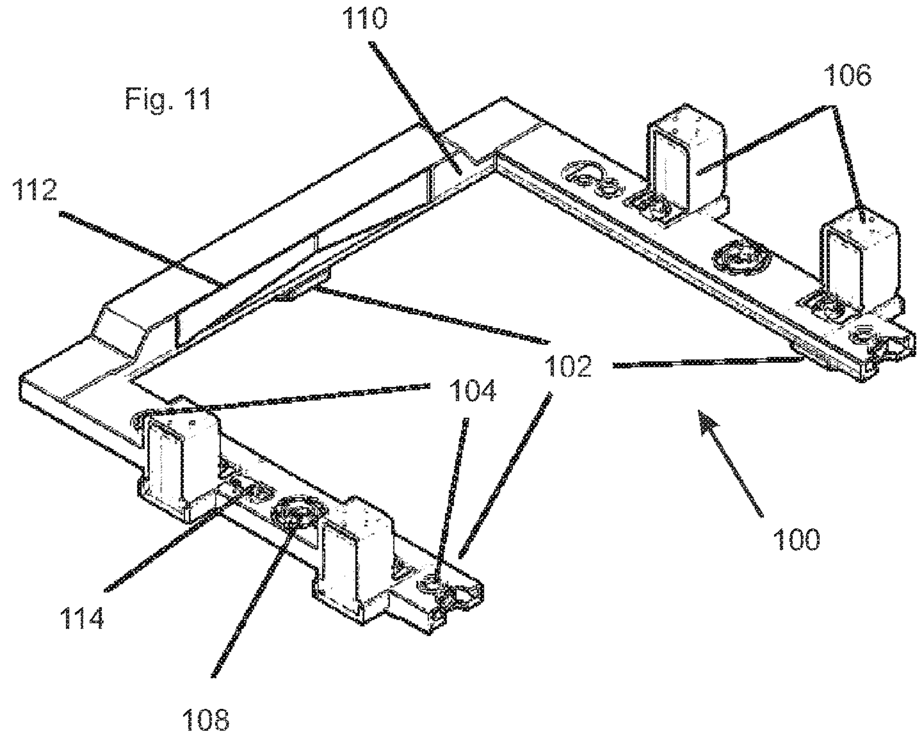
FIG. 11 shows a representation of the docking device/docking station.

FIG. 11 shows an embodiment of a docking station 100 which can be located, for example, in the vicinity of the forming device or the heating device. This docking station can be arranged here in a stationary manner. The docking station 100 preferably has three leveling elements 102, which serve for a straight arrangement or a desired target arrangement of a changing device arranged thereon. The reference sign 108 denotes a clamping cup which is preferably embodied as a pneumatically activated clamping cup. Reference sign 114 denotes a contacting device, which, for example, produces electrical connections, but also optionally pneumatic connections and mechanical connections. For example, the contacting device 114 can thus be a multi-plug.

Furthermore, several centering elements 104, such as centering sockets, are also provided, which preferably interact with corresponding centering pins of the counterpart, such as the frame, in order to center the frame relative to the docking station 100. Reference sign 112 denotes a strip and in particular a strip with a triangular contour as described above. Furthermore, drive devices such as lifting units are optionally present, wherein four lifting units 106 are provided here, which are preferably designed as pneumatic lifting units. Reference sign 110 denotes the main frame of the docking station.

The following FIG. 12-15 illustrate the sequence in a docking process.

Figure 12:
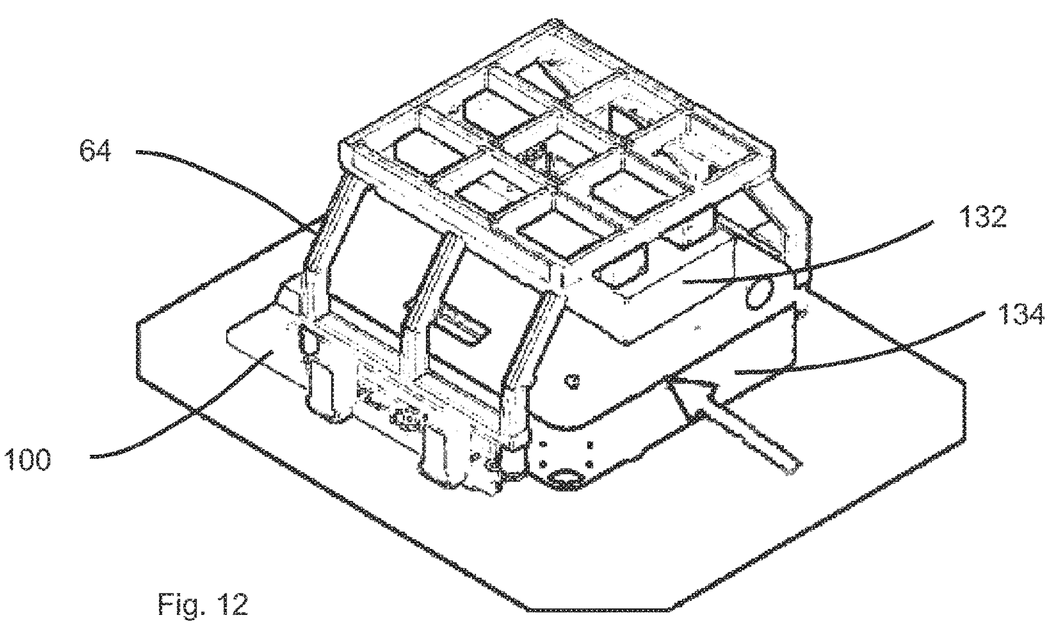
FIG. 12 shows a representation for performing a docking process.
Figure 13:
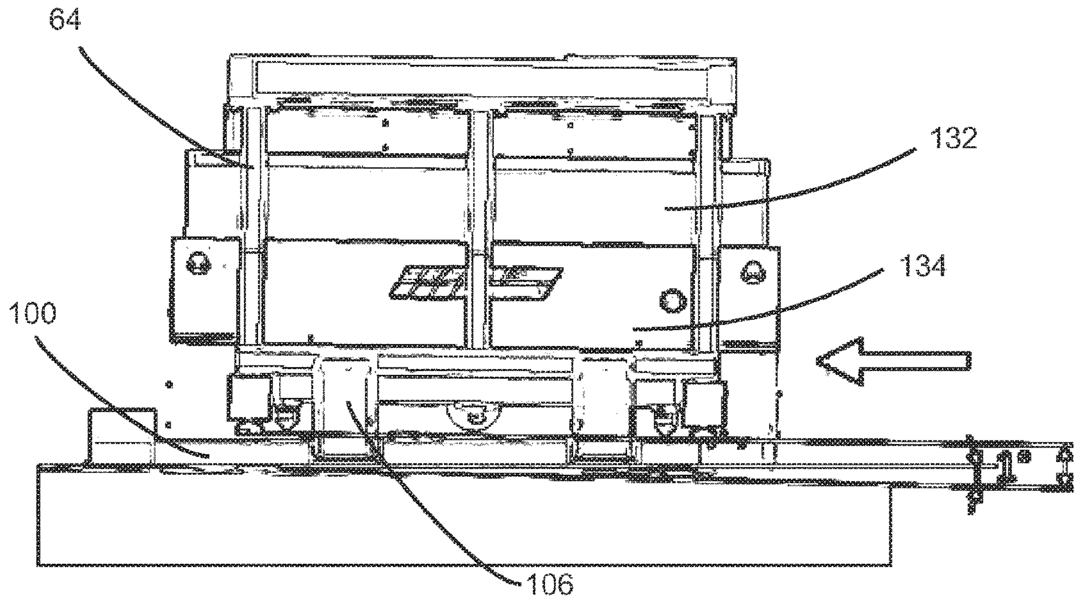
FIG. 13 shows a further representation for performing a docking process.
Figure 14:
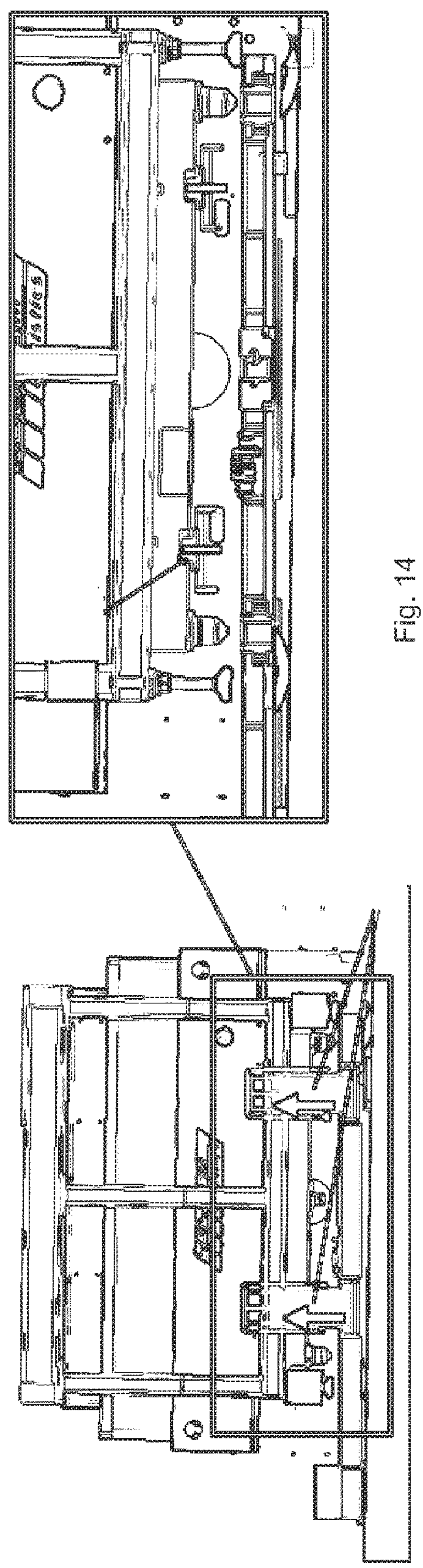
FIG. 14 shows a further representation for performing a docking process.
Figure 15:
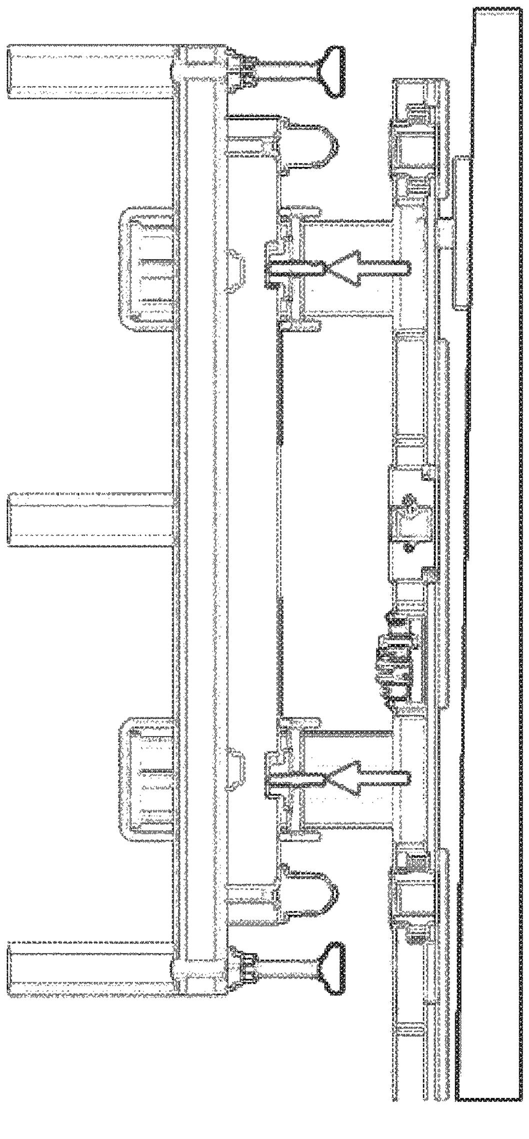
FIG. 15 shows a further representation for performing a docking process.

In the first step, the raised changing device is positioned above the docking station 100 with the help of the strip for the triangle drive (FIG. 12). The machine feet of the top unit can preferably be lifted by the shark at most approximately 100 mm above the ground. In addition, FIG. 13 additionally shows a floor slope of 1°, which must be compensated for by the docking station. Reference sign 132 denotes a lifting unit and reference sign 134 denotes a mobile robot (AGV).

Next (FIG. 14), the four pneumatic lifting units 106 are moved upward. In the sectional view at the top of the figure, the lifting pins can be seen which are preferably fastened to the pneumatic cylinders by a lifting console. Each cylinder extends out until a proximity switch in the lifting pin gives the signal for holding. The lifting pins are now located in sockets with play, which are attached to the underside of the top unit. The shark can now lower the top unit onto the four lifting pins of the docking station. Due to the play of the lifting pins in the sockets, there is no over-determination here. After lowering, the shark can move out of the docking station.

In a third step (cf. side view in FIG. 15), the lifting units are now moved simultaneously into the upper end position so that the angular offset of 1° is compensated for by the ground slope. Rotations about the x- and y-axis can be compensated for by the lifting units.

Figure 16:
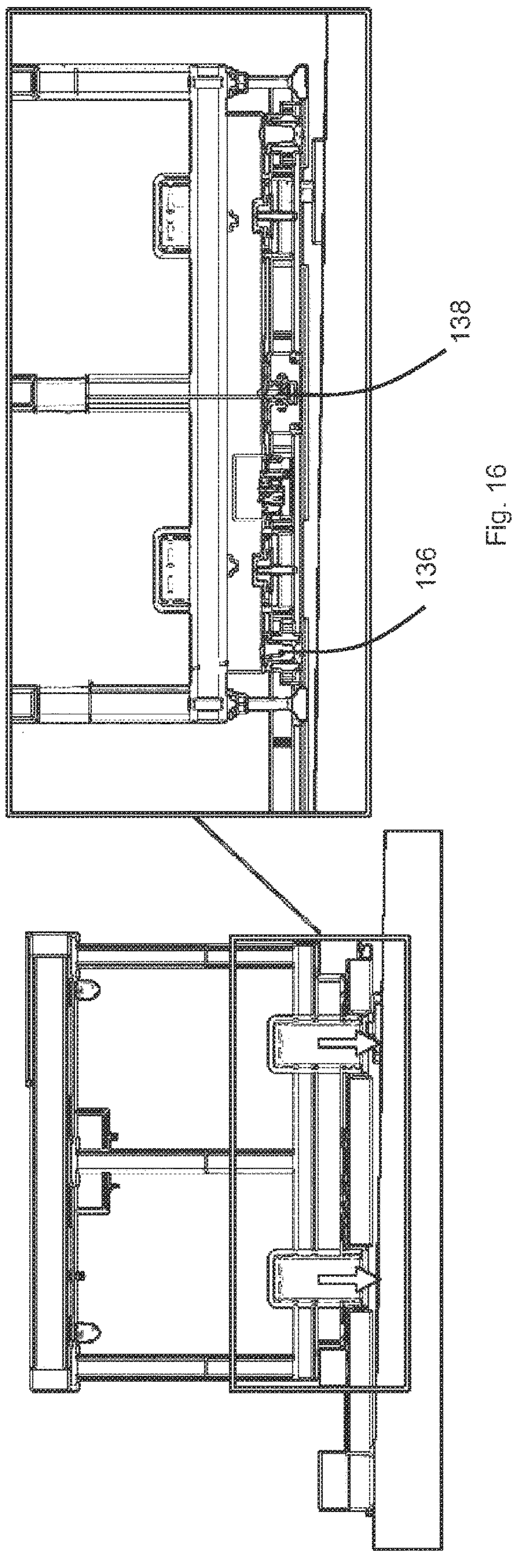
FIG. 16 shows a further representation for performing a docking process.

Next (FIG. 16), the lifting units are moved downward again. As a result, the centering pins of the top unit are inserted into the centering sockets. Since the lifting pins have play in the sockets, a rotation of the top unit in the z-axis or an offset of the x- and y-axis can be compensated.

In the case of the docking stations for the robot top unit, the clamping pins 138 of the top unit are preferably also inserted into the clamping cups by the further lowering. In addition, the contacts of the multi-plug are preferably closed. Lastly, the clamping cups are now actuated in order to produce a frictionally engaged connection between the docking station and the robot top unit. The docking process is thus completed. When a top unit is transferred to the mobile robot, the top unit is lifted by the lifting units and lowered onto the pre-positioned shark.

FIGS. 17*a*-17*d* illustrate the gripping of heating mandrels and shielding plates. First, the gripping device 50 is positioned by the robot of the changing device 6 (not shown) (cf. FIG. 17*a*). The fixed gripper jaw 52 is moved from the robot to the receptacle until the contact sensor 54 gives the signal for contact (FIG. 17*b*). The movable gripper jaw 56 is moved by the pneumatic cylinder 57 to the receptacle. This results in a frictionally engaged and form-fitting connection (FIG. 17*c*). The receptacle is now gripped and can be moved by the robot.

Figures 18A, 18B, 18C, 18D, 18E:
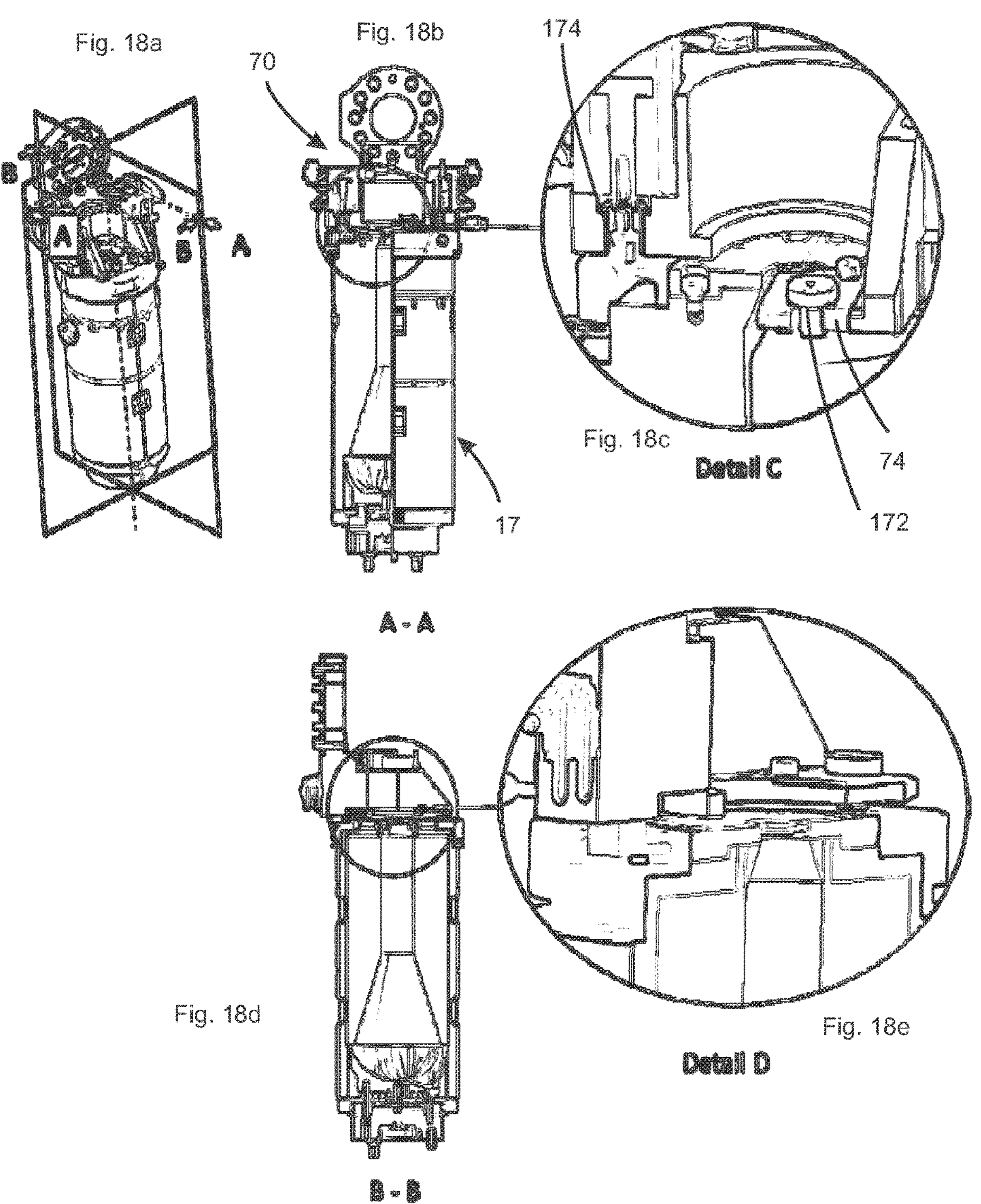
FIGS. 18*a*-18*e* show five representations to illustrate the gripping of blow molds.

FIG. 18*a*-18*e* show the gripping of blow molds. In FIGS. 18*a* and 18*b*, a gripping device with a received blow mold is shown. FIGS. 18*b*-18*e* show sectional views or details. When a blow mold is gripped, the fork 74 of the gripping device is first threaded into pins provided specifically for this purpose on the upper side of the blow mold (cf. detail C). Likewise, the holding plate is inserted into two pins (not shown) on the rear side of the blow mold (cf. detail D). This prevents the blow mold halves from unfolding during the movement of the robot.

The guide pins 174, which are fastened to the piston rod of the pneumatic cylinders, are pressed downwards by these (cf. detail C). This results in a frictionally engaged connection. As a result of the engagement of the conical guide pins in the head plate of the blow mold, a form fit also arises in addition. The bottom of the blow mold is connected to its side parts in such a way that it can only fall out when the blow mold is unfolded. The entire blow mold can thus be gripped and removed from the transport magazine with the aid of the robot and inserted into the respective blowing station in the blowing machine.

Figure 19:
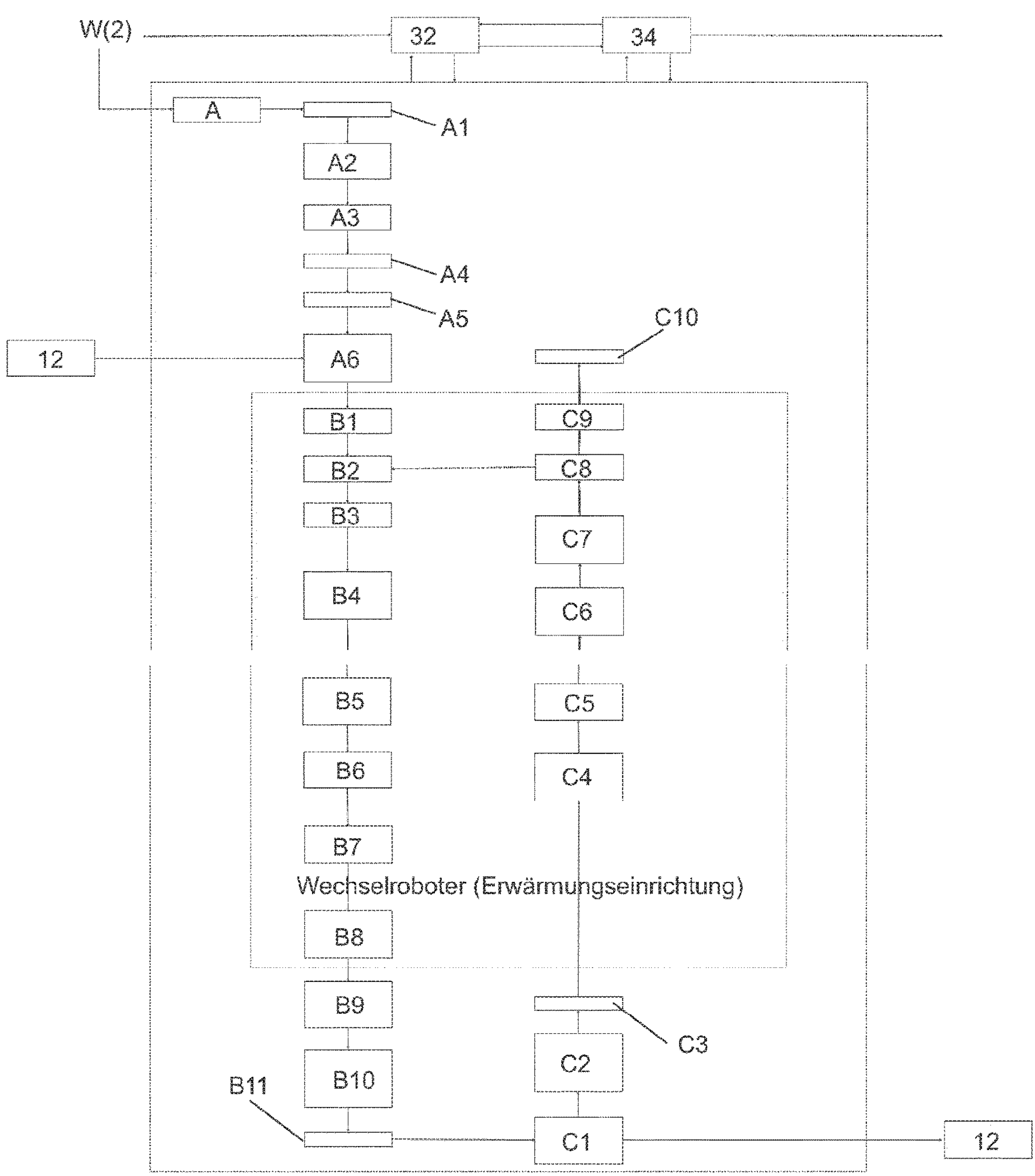
FIG. 19 shows a flowchart for illustrating the change of heating mandrels and shielding plates.

FIG. 19 illustrates a process flow W(2) with changeover of heating mandrels and/or shielding plates. A safety area is produced in method step A.

A safety area is preferably defined by a scanner, for example a laser scanner, before the changing device is received. As soon as an operator enters the safety area, the receiving of the changing device is interrupted, or an EMERGENCY STOP is triggered.

The scanner is preferably arranged on the mobile carrier (AGV) or is arranged in a stationary manner on the machine, for example on the docking station. Preferably, several scanners can also be used, wherein at least one first scanner is preferably arranged in a stationary manner and at least one second scanner is arranged in a mobile manner.

In the preferred steps, a changing device, i.e., the changing robot unit, is received (A1) and transported into a working position (step A2). If necessary, the changing robot unit is positioned (step A3) and set down (step A4). In a further step, a gripping device (which serves for the handling of the heating mandrels or shielding plates) is connected or coupled (step A5), if necessary. In an optional step A6, the transport unit and/or the magazine device 12 for the heating mandrels and/or shielding plates is checked.

The following steps are concerned with the actual changeover mode. In this case, a cover of the heating device is preferably first opened (step B1) and the transport device, in particular a circulating chain, is positioned (step B2). The heating mandrels are preferably moved, for example pressed downwards (step B3). In a further step, the magazine device or the receptacle for the heating mandrels and shielding plates is positioned (step B4).

In a further step, the shielding plates and/or heating mandrels are preferably locked on the magazine device (step B5). If present, a closure and in particular a quick-release closure of the shielding plates is released (step B6). Subsequently, the heating mandrels and/or shielding plates can be detached, for example pulled downwards (step B7). Lastly, the locking of the heating mandrels and shielding plates is preferably released (step B8).

In a further method step B9, the heating mandrels and/or shielding plates are gripped in the changing device and preferably transported into the magazine device and/or into an intermediate store (step B10). Optionally, in a further step B11 the individual grippers are released and the heating mandrels (in particular to be replaced) and/or shielding plates are gripped from the magazine device (step C1) and preferably gripped in a receptacle of the changing device (step C2). Subsequently, the respective grippers are preferably released (step C3).

In an optional step C4, the heating mandrels and/or shielding plates are locked on the changing device or the robot and subsequently arranged on the transport device, for example inserted into an oven chain (step C5). Preferably, a locking of the heating mandrels and/or shielding plates is then released (step C6) and a receptacle without the heating mandrels and/or shielding plates is moved and in particular lowered (step C7). In a further step, it is checked whether the change is complete (step C8). If this is not the case, the transport device is re-positioned (step B2). If the change is complete, the cover of the oven device is preferably closed (step C9) and lastly the grippers are released (in particular from the changing device) (step C10).

To carry out the change, corresponding commands are preferably output to the system 32 and in particular to the control and/or regulation unit of the blow molding machine and/or the heating device. Accordingly, commands are preferably also output to an control and/or regulation device 34 of the changing device.

More generally, the change runs as follows: The top unit or a changing robot must first be transported to the position on the heating module and set down. The transport unit 12 with the heating mandrels and shielding plates and/or the changeover attachment can already be transported before the changeover process at the location of the application.

It is preferably checked which gripper is connected to the robot. If necessary, the gripper is changed so that the gripper is connected to the robot for changing the heating mandrels and shielding plates. Subsequently, the transport unit is opened by this and the equipment parts contained therein can be tested by a sensor device, in particular the RFID reading head, if necessary.

In the following, the heating mandrels and shielding plates are automatically placed by the movable transport device, in particular the oven chain in the automatic changing machine, and the latter removes them and places them in a receptacle. The receptacle is then positioned by the machine such that it can be gripped by the robot.

The receptacle with preferably five heating mandrels and shielding plates is gripped by the gripper, as described above, and then positioned by the robot to a free position in the above-described transport unit. Then, the gripper is opened and the receptacle is set down in the transport unit.

Thereafter, a receptacle which is mounted with the “new” heating mandrels and shielding plates in the transport unit is received by the gripper. This is positioned in the automatic changing machine and the gripper is released.

By means of the automatic changing machine, the heating mandrels and shielding plates are now mounted again on the transport device, in particular an oven chain. The oven chain is now further moved, so that the next five heating mandrels and shielding plates to be changed are positioned in the automatic changing machine. In general, multiple change-over elements, in particular heating mandrels and/or shielding plates, are therefore preferably changed in one working step.

The process is then preferably repeated until all heating mandrels and shielding plates which are stored in a drawer module and/or which are to be arranged on the transport device have been changed. The drawer module is then closed by the gripper and the robot and the next drawer module is then opened. Several and preferably all heating mandrels and shielding plates are now replaced again in the above-described scheme from the newly opened drawer module. The processes are preferably repeated until all heating mandrels and shielding plates which are stored in the transport unit are changed. Lastly, the top unit and the transport unit are preferably transported to their storage location and set down.

Figure 20:
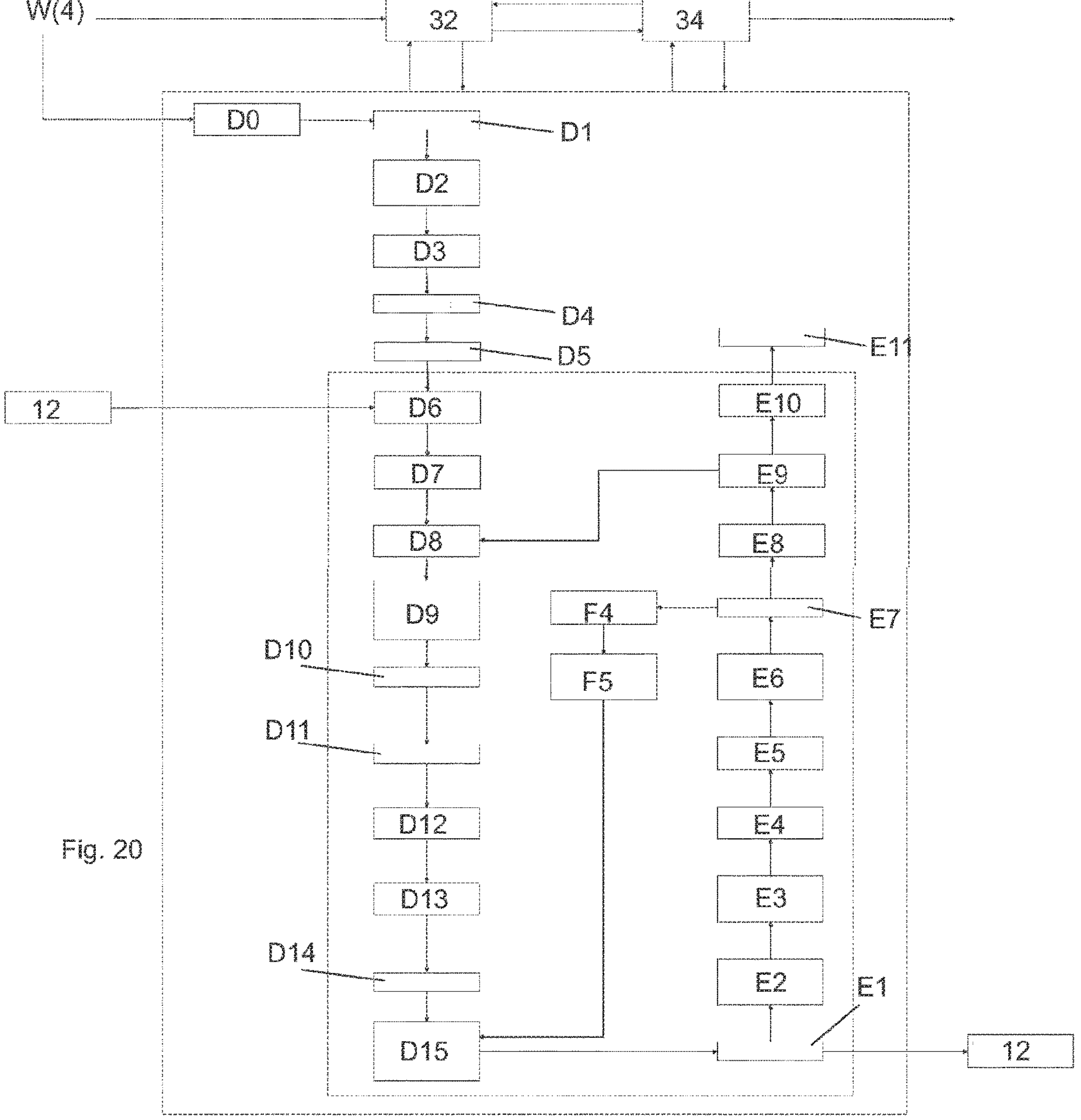
FIG. 20 shows a representation of the sequence for changing blow molds.

FIG. 20 illustrates a change W(4) of blow molds. A safety area is produced in method step D0. In the preferred steps, a changing device, i.e., the changing robot unit is received (step D1) and is transported into a working position (step D2). If necessary, the changing robot unit is positioned (step D3) and set down (step D4). In a further step, a gripping device (which serves for the handling of the heating mandrels or shielding plates) is connected or coupled (step D5) if necessary.

In a further preferred step D6, the transport of changing elements of the forming device (hereinafter referred to as the blow molds by way of example) is checked. In a step D7, protection of the forming device is opened and the blow mold carriers are transported (step D8). Furthermore, a centering and/or air supply of the blow mold carriers is preferably produced (step D9) and a blow mold is gripped (step D10).

The blow mold is then gripped (step D11), the blow mold is unlocked (in particular from its blow mold carrier) (step D12) and the blow mold carrier is opened (step D13). The blow mold is removed (step D14) and is preferably transported (in particular when the blow mold magazine is completely filled) into an intermediate placement area and/or is positioned there. Furthermore, a gripping device (which grips the blow molds) is preferably released (step E1) and a blow mold is gripped from the magazine device (step E2).

The (new, to be changed) blow mold is positioned in the blow mold carrier (step E3) and then the blow mold carrier is closed (step E4) and is preferably locked (step E5). In a further step, the blow mold is locked in or on the blow mold carrier (step E6), and the gripping device which grips the blow mold (step E7) is released.

In a further step, the intermediate placement area is checked (step F4) and, if blow molds are still located there, a further blow mold is gripped (step F5) and the steps from D15 are repeated.

If there is no longer a blow mold located in the intermediate placement area, the centering and/or the air supply is released (step E8) and it is checked whether the change is complete (step E9). If the change is not complete, it is repeated starting from step D8. If the change is complete, the protection of the forming device is closed (step E10). Lastly, the gripping devices are optionally separated from the changing robot.

In summary, the change of changing elements of the forming device is performed as follows: The top unit or the changing robot is first transported to the position on the forming device and set down. The transport unit with the blow molds can already be transported before the change-over process at the location of the application.

It is checked which gripping device is connected to the robot. If necessary, the gripper is changed so that the gripper is connected to the robot, in particular an articulated arm robot, for changing the blow molds. Subsequently, the transport unit for blow molds is checked by a sensor device, for example the RFID reading head. A closing device, for example a roller gate, preferably automatically opens on the blow molding machine, so that the articulated arm robot can engage in the blow molding machine.

A blow mold carrier of a forming station in the forming device is positioned in such a way that the robot can reach the latter. The blow mold carrier is oriented and in particular centered in the blow molding machine (preferably automatically and/or pneumatically). The robot gripper grips the blow mold in the blow mold carrier. The blow mold is unlocked in the blow mold carrier (preferably pneumatically). The blow mold carrier opens so that the blow mold can be removed. The blow mold can now be removed from the forming machine by the articulated arm robot of the changeover device and set down in the transport unit for the blow molds.

The gripping device moves away from the deposited blow mold and is positioned above a new blow mold in the blow mold magazine. The blow mold is gripped and lifted out of the transport unit by the changing robot. It is preferably positioned in the blow mold carrier. The blow mold carrier is closed and then pneumatically locked. The frictionally engaged and/or form-fitting connection of the gripping device is released. The gripper can now be moved away from the blow mold carrier by the (articulated arm) robot. The (preferably pneumatic) centering of the blow mold carrier is preferably released.

The processes are repeated until all blow molds are changed.

Lastly, the changing robot and the transport unit are transported to their storage location and set down.

The invention offers numerous advantages. For example, an automatic change of changing elements such as, in particular, heating mandrels and shielding plates and blow molds is made possible. The duration for retrofitting the forming device, for example a blow molding machine, when the mouth diameter of containers/preforms is significantly shortened. In this way, downtimes of filling and packaging systems can be significantly reduced. Furthermore, the invention also makes it possible to achieve a high utilization of an articulated arm robot. Preferably, a changing attachment with articulated arm robot can be used for changing the blow molds, heating mandrels and shielding plates on one or several machines and for other applications also on other machines (e.g., label roll changes).

The docking station described can also be used for other applications, for example in the material supply.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A system for producing plastic containers with a heating device for heating plastic preforms, wherein said heating device has a transport device configured for transporting plastic preforms along a predetermined first transport path, and a plurality of holding devices configured for holding the plastic preforms and at least one heating unit configured to heat the plastic preforms during the transport thereof and comprising a forming device configured for forming the plastic preforms into plastic containers, said forming device being configured for expanding the plastic preforms heated by the heating device by applying a flowable medium, wherein the forming device has a plurality of forming stations configured to form the plastic preforms to form the plastic containers, and wherein both the heating device and the forming device have changeable elements, wherein the system has a changing device which is configured for changing both changeable elements of the heating device and changeable elements of the forming device, wherein the changing device is movable between at least two different positions by a mobile robot, wherein the mobile robot is configured to pick up the changing device and configured to set the changing device down at different positions, and, wherein the mobile robot is configured to pick up the changing device by driving under and configured to set down the changing device at different positions using a lifting unit.

2. The system according to claim 1, wherein the changing device is movable between a first position, in which it is positioned for changing changeable elements of the heating device and a second position, in which the charging device is positioned for changing changeable elements of the forming device.

3. The system according to claim 1, wherein the system has a further transport device configured to transport the heated plastic preforms from the heating device to the forming device.

4. The system according to claim 1, wherein the changeable elements of the heating device are selected from a group of changeable elements consisting of gripping clamps, holding mandrels, and shielding plates configured for heat shielding, and/or the changeable elements of the forming device are selected from a group of elements consisting of gripping clamps, blow molds, blow mold parts, stretching rods, and blow nozzles.

5. The system according to claim 1, wherein the changing device has at least one gripping device configured for gripping the changeable element.

6. The system according to claim 5, wherein the changing device is configured to be equipped with at least two different gripping devices, wherein one of the gripping devices is configured for changing a changeable element of the heating device and the other of the gripping devices is configured for changing a changeable element of the forming device.

7. The system according to claim 1, wherein the changing device has a mobile carrier on which the robot device is arranged.

8. The system according to claim 1, wherein the system comprises at least one magazine device configured for storing changeable elements.

9. The system according to claim 1, wherein the system has at least one stationary docking station, on which at least one component of the changing device can be arranged at least temporarily.

10. The system according to claim 1, wherein the system has at least one identification device configured to identify at least one changeable element, and/or at least one detection device which is configured to enable the position determination of at least one element of the changing device.

11. The system according to claim 1, wherein the mobile robot is an automated guided vehicle, a driverless transport system or an autonomous mobile robot.

12. The system according to claim 8, wherein the magazine device is configured to be mobile, wherein the magazine device is configured to be moved by the mobile robot.

13. The system according to claim 8, wherein the magazine device is configured as a drawer magazine, wherein compartments are configured to be pulled out.

14. A method for operating a system for producing plastic containers, wherein plastic preforms are heated with a heating device in a working mode of the system, and wherein a transport device transports the plastic preforms along a predetermined first transport path, and a plurality of holding devices hold the plastic preforms, and at least one heating unit heats the plastic preforms during their transport, and wherein furthermore a forming device expands the plastic preforms heated by the heating device by applying a flowable medium and thus shapes them to form the plastic preforms, wherein the forming device has a plurality of forming stations, which shape the plastic preforms to form the plastic containers, and wherein both the heating device and the forming device have changeable elements, wherein a changing device changes both changeable elements of the heating device and changeable elements of the forming device in a changing mode, wherein the changing device is moved by a mobile robot between at least two different positions, wherein the mobile robot is configured to pick up the changing device and configured to set the changing device down at different positions, and, wherein the mobile robot is configured to pick up the changing device by driving under and configured to set down the changing device at different positions using a lifting unit.

15. The method according to claim 14, wherein the changing device is also equipped with different gripping devices and/or changing units in order to carry out the change of changeable elements of the forming device and the change of changeable elements of the heating device.

16. The method according to claim 14,
wherein
the changing device or components of the changing device are at least temporarily moved from a first position, which serves to change changeable elements of the forming device, into a second position, which serves for changing changeable elements of the heating device.

17. The method according to claim 14,
wherein
changeable elements are stored at least temporarily in a magazine device and this magazine device is also moved at least temporarily into different positions.

18. The method according to claim 14,
wherein
the changing device or a component of the changing device is at least temporarily positioned and/or fastened to a docking station.

* * * * *